US009069118B2

(12) United States Patent
Matsuo et al.

(10) Patent No.: US 9,069,118 B2
(45) Date of Patent: Jun. 30, 2015

(54) OPTICAL FAN-IN/FAN-OUT DEVICE

(71) Applicants: FUJIKURA LTD., Tokyo (JP); NAT'L UNIVERSITY CORPORATION HOKKAIDO UNIVERSITY, Sapporo-shi, Hokkaido (JP)

(72) Inventors: Shoichiro Matsuo, Sakura (JP); Katsuhiro Takenaga, Sakura (JP); Kunimasa Saitoh, Sapporo (JP); Masanori Koshiba, Sapporo (JP)

(73) Assignees: FUJIKURA LTD., Tokyo (JP); NATIONAL UNIVERSITY CORPORATION HOKKAIDO UNIVERSITY, Sapporo-shi (JP)

( * ) Notice: Subject to any disclaimer, the term of this patent is extended or adjusted under 35 U.S.C. 154(b) by 170 days.

(21) Appl. No.: 13/936,624

(22) Filed: Jul. 8, 2013

(65) Prior Publication Data

US 2014/0010508 A1 Jan. 9, 2014

(30) Foreign Application Priority Data

Jul. 9, 2012 (JP) ................................ 2012-153848

(51) Int. Cl.

*G02B 6/036* (2006.01)
*G02B 6/02* (2006.01)
*G02B 6/14* (2006.01)
*G02B 6/255* (2006.01)

(52) U.S. Cl.

CPC ........ *G02B 6/02042* (2013.01); *G02B 6/03638* (2013.01); *G02B 6/14* (2013.01); *G02B 6/2552* (2013.01)

(58) Field of Classification Search

USPC .................................................. 385/43, 137
See application file for complete search history.

(56) References Cited

U.S. PATENT DOCUMENTS

| | | | | |
|---|---|---|---|---|
| 7,016,573 | B2 * | 3/2006 | Dong et al. | 385/46 |
| 7,492,993 | B2 * | 2/2009 | Nakai et al. | 385/46 |
| 8,515,220 | B1 * | 8/2013 | Khitrov et al. | 385/14 |
| 8,693,088 | B2 * | 4/2014 | Fini et al. | 359/334 |
| 2007/0003196 | A1 * | 1/2007 | Holcomb et al. | 385/115 |
| 2010/0278486 | A1 * | 11/2010 | Holland et al. | 385/43 |
| 2011/0235165 | A1 * | 9/2011 | Sugimoto et al. | 359/341.3 |
| 2011/0280517 | A1 * | 11/2011 | Fini et al. | 385/43 |
| 2012/0183304 | A1 * | 7/2012 | Winzer et al. | 398/142 |
| 2013/0063809 | A1 * | 3/2013 | Nishihara et al. | 359/341.2 |
| 2013/0216184 | A1 * | 8/2013 | Kopp et al. | 385/43 |

* cited by examiner

*Primary Examiner* — Sung Pak
(74) *Attorney, Agent, or Firm* — Westerman, Hattori, Daniels & Adrian, LLP

(57) ABSTRACT

A radius of a first core 21 in a large-diameter end surface EF1 of a tapered portion 31 is denoted by $r_{1S}$, a radius of a second core 22 is denoted by $r_{2S}$, a relative refractive index difference of the first core 21 with respect to a clad 23 is denoted by $\Delta_1$, a relative refractive index difference of the second core 22 with respect to the clad 23 is denoted by $\Delta_2$, a refractive index volume of the first core 21 is denoted by $V_{1S}$, and a refractive index volume of the second core 22 is denoted by $V_{2S}$, $r_{2S}/r_{1S}$ is set to be 3 or more and 5 or less, $V_{2S}/V_{1S}$ is set to be $1.07r_2^2-13.5$ or more and $1.07r_2^2-11.5$ or less, and $r_{2S}/r_{1S}$ is set to be $-3\times\Delta_1/\Delta_2+10$ or more.

3 Claims, 20 Drawing Sheets

OPTICAL FAN-IN/FAN-OUT DEVICE

BACKGROUND OF THE INVENTION

The present invention relates to an optical fan-in/fan-out device, and more particularly, to an optical fan-in/fan-out device for a multi-core fiber.

RELATED ART

A multi-core fiber has a structure where a circumference surface of a plurality of cores is surrounded with a clad, so that a signal can be transmitted through each core.

An example of the optical fan-in/fan-out device for the multi-core fiber is disclosed in US 2011/0280517 A1.

The optical fan-in/fan-out device is manufactured by integrating a single-core optical fiber with each of a plurality of holes bored in a capillary and extending the capillary, and the optical fiber is shrunk in diameter from the one end side toward the other end side.

SUMMARY OF THE INVENTION

As disclosed in US 2011/0280517 A1, in a case where the optical fiber is shrunk in diameter from the one end side toward the other end side, there is a tendency in that a degree of change in mode field diameter in the longitudinal direction of the optical fiber is increased. Therefore, radiation mode light is increased in the propagating light, and thus, there is a problem in that excessive loss easily occurs.

An object of the present invention is to provide an optical fan-in/fan-out device capable of further reducing loss.

To solve the above problem, an optical fan-in/fan-out device of the present invention includes: a plurality of relay fibers; and an outer circumference clad which is integrated with each of the plurality of relay fibers to fill a space between the relay fibers and to surround a circumference surface of each relay fiber, wherein the relay fiber includes: a first core; a second core which has a refractive index lower than a refractive index of the first core and surrounds a circumference surface of the first core without clearance; and a clad which has a refractive index lower than the refractive index of the second core and surrounds a circumference surface of the second core without clearance, wherein the outer circumference clad has a tapered portion by which the plurality of relay fibers is shrunk in diameter from the one end side toward the other end side, wherein in a case where a radius of the first core in a large-diameter end surface of the tapered portion is denoted by $r_{1S}$, a radius of the second core in the large-diameter end surface is denoted by $r_{2S}$, a relative refractive index difference of the first core with respect to the clad is denoted by $\Delta_1$, a relative refractive index difference of the second core with respect to the clad is denoted by $\Delta_2$, a refractive index volume of the first core expressed by $r_{1S}^2\times\Delta_1$ is denoted by $V_{1S}$, and a refractive index volume of the second core expressed by $\pi(r_{2S}^2-r_{1S}^2)\times\Delta_2$ is denoted by $V_{2S}$, the following equation is satisfied.

$$3\leq r_{2S}/r_{1S}\leq 5$$

$$1.07r_{2S}-13.5\leq V_{2S}/V_{1S}\leq 1.07r_{2S}-11.5 \quad (1)$$

$$r_{2S}/r_{1S}\geq -3\times\Delta_1/\Delta_2+10$$

In a case where $V_{2S}/V_{1S}$ is set to be $1.07r_{2S}-13.5$ or more and $1.07r_{2S}-11.5$ or less, even if some difference occurs in elongation rate of the relay fiber or the like, a degree of a change in mode field diameter in the longitudinal direction of the tapered portion can be reduced. This is verified through experiments or the like by the inventors of the present invention.

In addition, the $r_{2S}/r_{1S}$ is set to be 3 or more, so that the first core of the relay fiber in the large-diameter end surface side of the tapered portion can be prevented from allowing the second core not to effectively function as a waveguide supposedly of the clad in advance. On the other hand, the $r_{2S}/r_{1S}$ is set to be 5 or less, so that an increase in the loss particularly easily occurring in the large-diameter end surface side of the tapered portion in a case where $r_{1S}$ is relatively reduced so that $r_{2S}/r_{1S}$ exceeds 5 can be suppressed. In addition, a change in a single-mode characteristic particularly easily occurring in the small-diameter end surface side of the tapered portion in a case where $r_{2S}$ is relatively increased so that $r_{2S}/r_{1S}$ exceeds 5 is suppressed, so that the single-mode characteristic can be maintained.

In addition, $r_{2S}/r_{1S}$ is set to be $-3\times\Delta_1/\Delta_2+10$ or more, so that the condition that the $r_{2S}/r_{1S}$ is set to be 3 or more and 5 or less and $V_{2S}/V_{1S}$ is set to be $1.07r_{2S}^2-13.5$ or more and $1.07r_{2S}^2-11.5$ or less is limited. Accordingly, the effective cross-sectional area of the first core in each relay fiber end surface in the large-diameter end surface side of the tapered portion can be prevented from being too large or too small in advance.

In this manner, the above-described Equation (1) is satisfied, so that the optical fan-in/fan-out device capable of further reducing the loss can be implemented.

Therefore, for example, even in a case where a difference in degree of elongation rate of the relay fiber or the like occurs due to a variation in the manufacturing or the like, the optical fan-in/fan-out device capable of further reducing the loss can be implemented.

In addition, it is preferable that the relative refractive index difference of the outer circumference clad with respect to the clad be set to be in a range of -0.1% or more and 0.1% or less.

In a case where the relative refractive index difference of the outer circumference clad with respect to the clad is set to be less than -0.1%, there is large possibility in that a mode where light propagates through the clad with respect to the outer circumference clad occurs.

On the other hand, in a case where the relative refractive index difference of the outer circumference clad with respect to the clad exceeds 0.1%, in the arrangement where the plurality of relay fibers surrounds a specific relay fiber, high-order mode light occurring in the specific relay fiber is difficult to escape due to existence of the clad in the relay fibers adjacent to the specific relay fiber. Therefore, there is large possibility in that the high-order mode light is coupled with basic mode light in the specific relay fiber.

Therefore, the relative refractive index difference of the outer circumference clad with respect to the clad is set to be -0.1% or more and 0.1% or less, so that the multi-optical path interference caused by the above-described possibility is reduced. Accordingly, the loss can be suppressed by an amount corresponding to the reduction of the multi-optical path interference.

In addition, it is preferable that the optical fan-in/fan-out device further include an outermost circumference clad which surrounds the circumference surface of the outer circumference clad without clearance, and the refractive index of the outermost circumference clad is higher than the refractive index of the outer circumference clad.

According to the configuration, absorption efficiency of a high-order mode in the vicinity of the circumference surface of the outer circumference clad can be increased, so that multi-optical path interference caused by the high-order mode is reduced. Accordingly, the loss can be further suppressed.

As described hereinbefore, according to the present invention, it is possible to implement an optical fan-in/fan-out device capable of further reducing loss.

DETAILED DESCRIPTION OF THE INVENTION

First Embodiment

A preferred first embodiment of the present invention will be described in detail with reference to the drawings.

Figure 1:
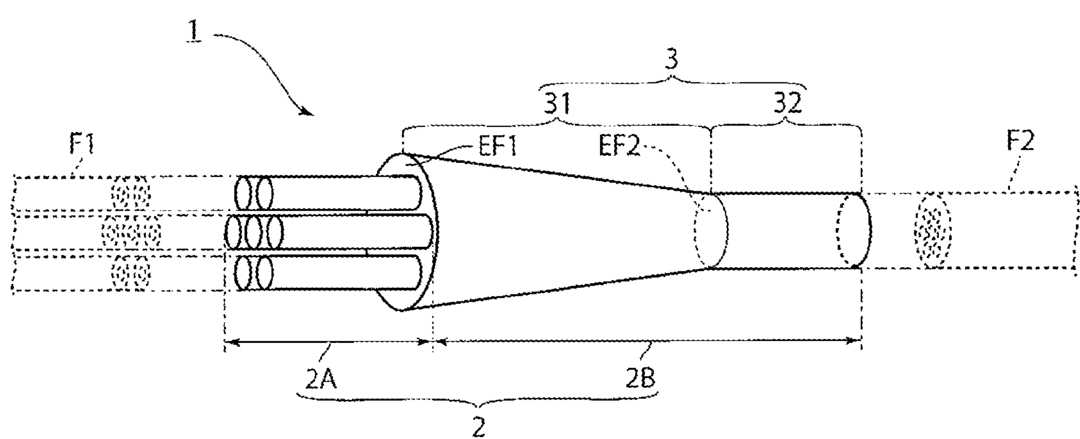
FIG. 1 is a diagram illustrating an optical fan-in/fan-out device according to a first embodiment.

FIG. 1 is a diagram illustrating an optical fan-in/fan-out device 1 according to a first embodiment. As illustrated in FIG. 1, the optical fan-in/fan-out device 1 according to the embodiment includes a plurality of relay fibers 2 and an outer circumference clad 3.

Each relay fiber 2 is an optical fiber for relaying a core of a single-core optical fiber F1 and one core of a multi-core fiber F2 and has an exposed portion 2A exposed from the outer circumference clad 3.

In the exposed portion 2A, the relay fibers 2 are separated from each other by an air gap, and an end surface of the relay fiber 2 is considered to be a portion which is to be fused and connected to the one end surface of the single-core optical fiber F1.

Figure 2A:
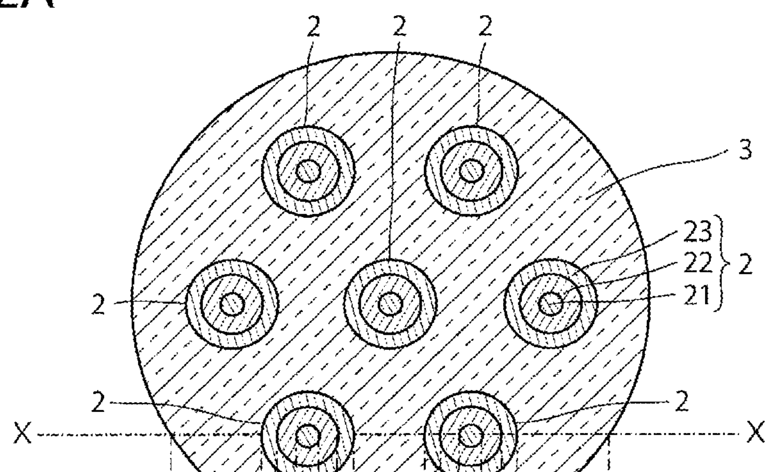
FIGS. 2A and 2B are diagrams illustrating a state of a cross section perpendicular to a longitudinal direction of an optical fan-in/fan-out device.
Figure 2B:
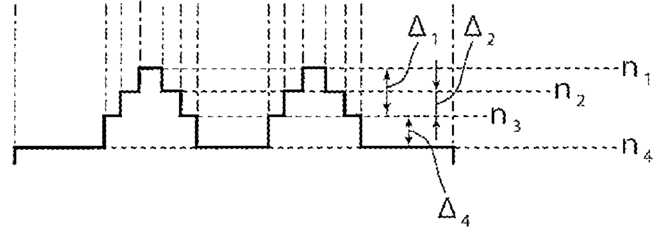

FIGS. 2A and 2B are diagrams illustrating a state of a cross section perpendicular to a longitudinal direction of the optical fan-in/fan-out device 1. More specifically, FIG. 2A illustrates a cross section of a large-diameter end surface EF1 of a tapered portion 31 of FIG. 1, and FIG. 2B illustrates refractive index distribution in line X-X of FIG. 2A.

As illustrated in FIG. 2A, in the embodiment, the number of the relay fibers 2 is set to seven. In addition, one relay fiber 2 is located at the center, and six relay fibers 2 are arranged to be separated by an an equidistance from the central relay fiber 2. In addition, distances of the relay fibers 2 from the center are equal to each other.

In this arrangement, the seven relay fibers 2 are set to be symmetric with respect to an axis of the outer circumference clad 3 so that optical properties caused from the arrangement of the relay fibers 2 are maintained uniform.

In addition, the relay fiber 2 has a structure of including a first core 21, a second core 22 which surrounds a circumference surface of the first core 21 without clearance, and a clad 23 which surrounds a circumference surface of the second core 22 without clearance.

As illustrated in FIGS. 1 and 2A, the outer circumference clad 3 is integrated with a portion 2B from a middle position of each of the plurality of relay fibers 2 to the other ends of each of the plurality of relay fibers 2 so as to fill a space between the relay fiber portions and to surround the circumference surface of each relay fiber portion. In addition, the outer circumference clad 3 has a tapered portion 31 where each relay fiber 2 is shrunk in diameter from the one end side toward the other end side.

In the embodiment, a small-diameter portion 32 which is extended in a diameter substantially the same as the diameter of the small-diameter end surface EF2 is formed to be integrated with a small-diameter end surface EF2 which is the opposite side of a large-diameter end surface FF1 of the tapered portion 31. The end surface of the small-diameter portion 32 is a portion which is to be fused and connected to the one end surface of the multi-core fiber F2.

The optical fan-in/fan-out device 1 is manufactured by inserting the relay fibers 2 into a plurality of holes bored in a capillary, and after that, extending the one end of the capillary while the entire capillary is heated so as to be fused with the relay fibers 2 so that the capillary is shrunk in diameter.

Next, parameters such as a refractive index and the like of the optical fan-in/fan-out device 1 will be described. As illustrated in FIG. 2B, in the relay fiber 2, the refractive index $n_2$ of the second core 22 is set to be lower than the refractive index $n_1$ of the first core 21, and the refractive index $n_3$ of the clad 23 is set to be lower than the refractive index $n_2$ of the second core 22. Namely, with respect to the refractive indexes of the relay fibers 2, the first core 21 located at the center of the relay fiber 2 has the highest refractive index, and the refractive indexes are decreased step by step from the center in the order of the second core 22 and the clad 23. In addition, the outer circumference clad 3 has a refractive index $n_4$.

In addition, a relative refractive index difference of the first core 21 with respect to the clad 23 is denoted by $\Delta_1$; the relative refractive index difference of the second core 22 with respect to the clad 23 is denoted by $\Delta_2$; and the relative refractive index difference of the outer circumference clad 3 with respect to the clad 23 is denoted by $\Delta_4$.

Figure 3A:
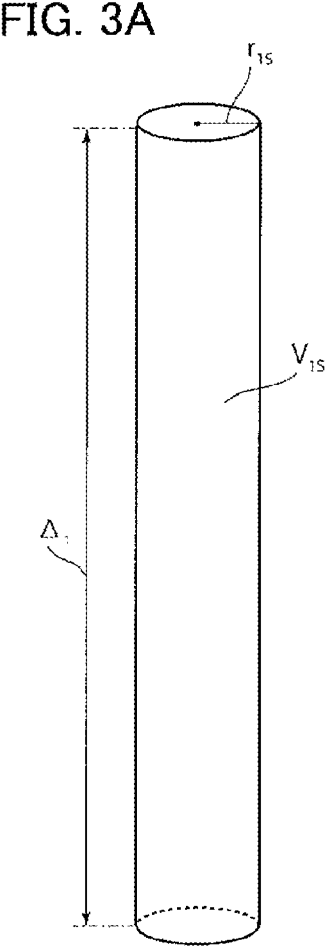
FIGS. 3A and 3B are diagrams illustrating parameters of a relay fiber.
Figure 3B:
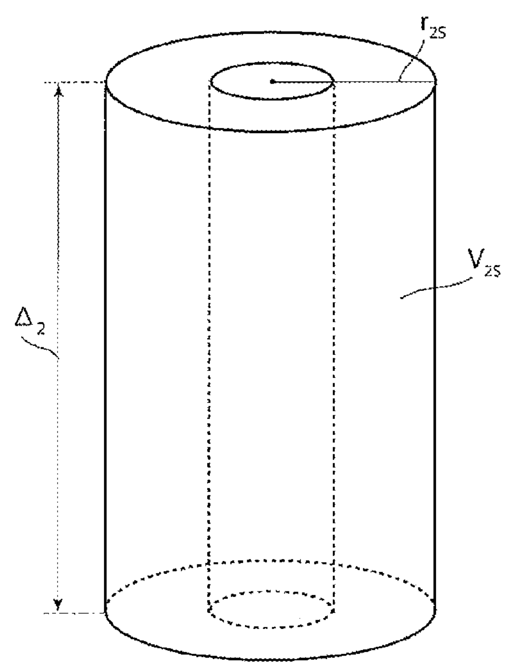

FIGS. 3A and 3B are diagrams illustrating parameters of the relay fiber 2. More specifically, FIG. 3A illustrates parameters of the first core 21, and FIG. 3B illustrates parameters of the second core 22.

As illustrated in FIGS. 3A and 3B, a radius of the first core 21 in the large-diameter end surface EF1 (refer to FIG. 1) of the tapered portion 31 is denoted by $r_{1S}$; the radius of the second core 22 in the large-diameter end surface EF1 is denoted by $r_{2S}$; the relative refractive index difference of the first core 21 with respect to the clad 23 is denoted by $\Delta_1$; and the relative refractive index difference of the second core 22 with respect to the clad 23 is denoted by $\Delta_2$. In this case, the refractive index volume $V_{1S}$ of the first core 21 is expressed by $\pi r_{1S}^2 \times \Delta_1$. In addition, the refractive index volume $V_{2S}$ of the second core 22 is expressed by $\pi(r_{2S}^2 - r_{1S}^2) \times \Delta_2$. The refractive index volumes $V_{1S}$ and $V_{2S}$ are indexes indicating capacity of confining propagating light within the first core 21 or the second core 22, respectively.

In the embodiment, a ratio $r_{2S}/r_{1S}$ of the radius $r_{2S}$ of the second core 22 to the radius $r_{2S}$ of the first core 21 and a ratio $V_{2S}/V_{1S}$ of the refractive index volume $V_{2S}$ of the second core 22 to the refractive index volume $V_{1S}$ of the first core 21 satisfy the above-described Equation (1). Namely, $r_{2S}/r_{1S}$ is set to be 3 or more and 5 or less and $-3 \times \Delta_1/\Delta_2 + 10$ or more, and $V_{2S}/V_{1S}$ is set to be $1.07r_{2S} - 13.5$ or more and $1.07r_{2S} - 11.5$ or less.

In addition, in the embodiment, the relative refractive index difference $\Delta_4$ of the outer circumference clad 3 with respect to the clad 23 is set to be -0.1% or more and 0.1% or less.

As described hereinbefore, in the optical fan-in/fan-out device 1 according to the embodiment, each of the plurality of relay fiber portions 2B is integrated with the outer circumference clad 3, and the outer circumference clad 3 fills a space between the relay fiber portions 2B and surrounds the circumference surface of each relay fiber portion 2B. In addition, each of the relay fiber portions 2B is shrunk in diameter from the one end side toward the other end side by the tapered portion 31 of the outer circumference clad 3.

Therefore, in the optical fan-in/fan-out device 1, the core of the single-core optical fiber F1 which is fused and connected to the end surface of the relay fiber 2 which is the large-diameter end surface EF1 side of the tapered portion 31 can be coupled with the core of the multi-core fiber F2 which is fused and connected to the end surface of the small-diameter portion 32 which is the small-diameter end surface EF2 side of the tapered portion 31.

Figures 4A, 4B:
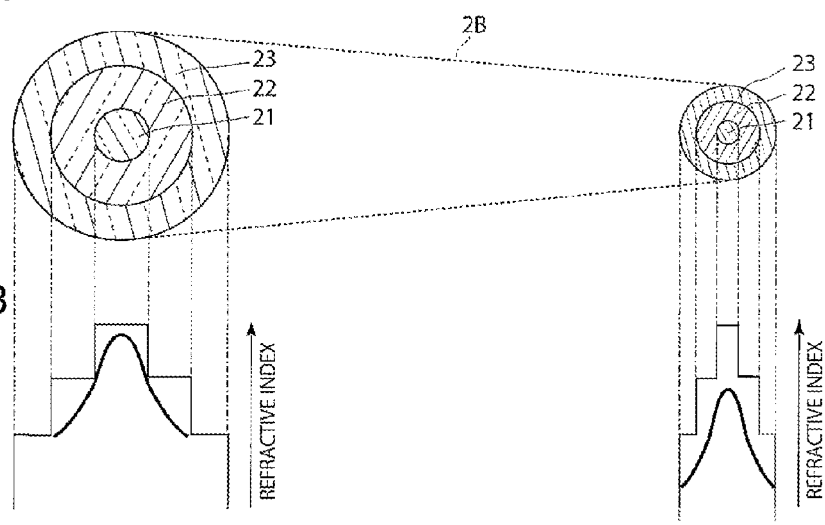
FIGS. 4A and 4B are diagrams illustrating states of light distribution in a large-diameter end surface and a small-diameter end surface of a relay fiber.

FIGS. 4A and 4B are diagrams illustrating states of light distribution in the large-diameter end surface side and the small-diameter end surface side of the relay fiber 2 in the tapered portion 31.

As illustrated in FIGS. 4A and 4B, since the relay fiber portion 2B is shrunk in diameter from the one end side toward the other end side by the tapered portion 31, in the large-diameter end surface side of the relay fiber portion 2B, the second core 22 functions as a waveguide supposedly of the clad, so that the propagating light is mainly confined within the first core 21. On the contrary, in the small-diameter end surface side of the relay fiber portion 2B, the second core 22 which becomes a core with respect to the clad 23 functions as a waveguide, so that the propagating light is mainly confined within the second core 22.

However, due to variations or the like in the manufacturing of the optical fan-in/fan-out device 1, there is a tendency in that an elongation rate of the relay fiber portion 2B, a degree of diameter shrinkage of the first core 21 or the second core 22 in the longitudinal direction of the relay fiber portion 2B, or the like is easily different.

If there is such a difference, a degree of a decrease in light confining capability of the first core 21 and the second core 22 varies in the longitudinal direction of the relay fiber portion 2B, so that a degree of a change in mode field diameter in the longitudinal direction is increased.

In this respect, in the optical fan-in/fan-out device 1 according to the embodiment, as expressed by the above-described Equation (1), the $V_{2S}/V_{1S}$ of the refractive index volume $V_{2S}$ of the second core 22 to the refractive index volume $V_{1S}$ of the first core 21 is set to be $1.07r_{2S} - 13.5$ or more and $1.07r_{2S} - 11.5$ or less.

If this condition is satisfied, even if some difference occurs in elongation rate of the relay fiber 2, a degree of a change in mode field diameter in the longitudinal direction of the relay fiber portion 2B can be reduced. This is verified through experiments by the inventors of the present invention.

In addition, in the optical fan-in/fan-out device 1 according to the embodiment, as expressed by the above-described Equation (1), the ratio of the $r_{2S}/r_{1S}$ of the radius $r_{2S}$ of the second core 22 to the radius $r_{1S}$ of the first core 21 is set to be 3 or more and 5 or less.

In a case where $r_{2S}/r_{1S}$ is less than 3, the second core 22 in the relay fiber portion 2A exposed from the outer circumference clad 3 or the large-diameter end surface side of the tapered portion 31 does not function as a waveguide supposedly of the clad, and the propagation which the second core 22 operates to the outer circumference clad 3 becomes dominant. For this reason, there is a very large difference in mode field diameter with respect to the single-core fiber F1, so that excessive coupling loss occurs. In addition, since the second core 22 is in a multimode with respect to the outer circumference clad 3, a high-order mode may occur with high possibility due to a shift of axis between the single-core fiber F1 and the relay fiber portion 2A. Since the high-order mode, which has occurred, is coupled with adjacent cores to cause crosstalk in the tapered portion 31, the high-order mode is not preferred. Therefore, $r_{2S}/r_{1S}$ is set to be 3 or more, so that a device having small insertion loss and good crosstalk can be obtained.

On the other hand, in a case where $r_{1S}$ in $r_{2S}/r_{1S}$ is relatively reduced so that $r_{2S}/r_{1S}$ exceeds 5, there is a tendency in that the loss in the large-diameter end surface side of the tapered portion 31 is particularly easily increased. In addition, in a case where $r_{2S}$ in $r_{2S}/r_{1S}$ is relatively increased so that $r_{2S}/r_{1S}$ exceeds 5, there is a tendency in that a single-mode characteristic in the small-diameter end surface side of the tapered portion 31 may not be maintained. Therefore, $r_{2S}/r_{1S}$ is set to be 5 or less, so that an increase in loss in the large-diameter end surface side of the tapered portion 31 is suppressed and the single-mode characteristic in the small-diameter end surface side of the tapered portion 31 can be maintained.

In order to reduce the insertion loss of the optical fan-in/fan-out device 1, it is preferable that a difference between the effective cross-sectional area or mode field diameter of the two ends of the optical fan-in/fan-out device 1 and the effective cross-sectional area or mode field diameter of each of the single-core optical fiber F1 and the multi-core fiber F2 be maintained small.

If the mode field diameters of rays of light propagating through the cores of the two optical fibers where the mode field diameter of the rays of light propagating through the cores are different are denoted by $MFD_1$ and $MFD_2$, respectively, the loss "a" of the ray of light occurring in a case where the optical fibers are coupled is expressed by the following equation.

$$a = -10\log\left(\frac{2\frac{MFD_1}{2}\frac{MFD_2}{2}}{\left(\frac{MFD_1}{2}\right)^2+\left(\frac{MFD_2}{2}\right)^2}\right) \quad (2)$$

For example, if the mode field diameters of the rays of light propagating through the cores of the two optical fibers are set to be 9 μm and 8.4 μm, respectively, the coupling loss "a" becomes 0.04 dB by the above-described Equation (2). If the coupling loss has the above-described value, the two optical fibers can be coupled with each other without practical problems. In addition, in a case where the difference in mode field diameter between the optical fibers is 1 μm, the coupling loss "a" becomes 0.06 dB. In this case, the two optical fibers can also be coupled with each other without practical problems.

Therefore, in a case where the difference between the mode field diameter of each relay fiber end surface which is in the large-diameter end surface side of the tapered portion 31 and the mode field diameter of the end surface of the single-core fiber F1 which is to be coupled with the end surface is set to be 1 μm or less and difference between the mode field diameter of each relay fiber end surface which is in the small-diameter end surface side of the tapered portion 31 and the mode field diameter of each fiber end surface of the multi-core fiber F2 which is to be coupled with the end surface is set to be 1 μm or less, there is no practical problem in the coupling loss.

In addition, a generally widely used a single mode fiber is recommended in ITU-T G. 652 (November, 2009), where a tolerance in mode field diameter is regulated to be ±0.6 μm. In addition, a fiber for long-distance transmission line such as a submarine line is recommended in ITU-T G. 654 (December, 2006), where a tolerance in mode field diameter is regulated to be ±0.7 μm. The tolerance is regulated in terms of the coupling loss including the shift of axis. Therefore, if the difference in mode field diameter is set to be 1 μm or less as described above, very small coupling loss based on the international recommendation can be secured.

On the other hand, a relation between the mode field diameter MFD of the ray of light propagating through the optical fiber and effective cross-sectional area $A_{eff}$ of the core is expressed by the following equation.

$$A_{eff} = k\frac{\pi}{4}(MFD)^2 \quad (3)$$

Herein, k in the above-described Equation (3) is a coefficient depending on a refractive index of a core.

In a general optical fiber, the coefficient k has a value in a range of about 0.960 to about 0.985 according to ITU-T G. 650.2 and Transmission Media and Optical Systems Characteristics - Optical Fibre Cables (July, 2007). In the case where the mode field diameter is 10 μm, the effective cross-sectional area $A_{eff}$ of the core is in a range of 75 $\mu m^2$ to 77 $\mu m^2$ by the above-described Equation (3). In the case where the mode field diameter MFD is changed from $MFD_1$ to $MFD_2$, if a changed amount is denoted by Δ, the changed amount $A\Delta A_{eff}$ of the effective cross-sectional area $A_{eff}$ of the core is expressed by the following equation.

$$\begin{aligned}\Delta A_{eff} &= A_{eff2} - A_{eff1} \quad (4)\\ &= k\frac{\pi}{4}(MFD_2^2 - MFD_1^2)\end{aligned}$$

-continued $$\begin{aligned}&= k\frac{\pi}{4}\{(MFD_1+\Delta)^2 - MFD_1^2\}\\ &= k\frac{\pi}{4}(2\Delta MFD_1 + \Delta^2)\end{aligned}$$

Herein, $A_{eff1}$ in the above-described Equation (4) denotes an effective cross-sectional area in the case where the mode field diameter is $MFD_1$ and $A_{eff2}$ in the above-described Equation (4) denotes an effective cross-sectional area in the case where the mode field diameter is $MFD_2$.

For example, in the case where the mode field diameter is changed from 10 μm to 11 μm by 1 μm, the effective cross-sectional area of the core is changed to be in a range of 15.8 $\mu m^2$ to 16.2 $\mu m^2$. Therefore, if the effective cross-sectional area of the core is in a range of about ±15 $\mu m^2$ with respect to the central value, the fibers can be coupled at very small coupling loss. In addition, if the effective cross-sectional area of the core is in a range of ±10 $\mu m^2$, it can be expected that the fibers are coupled at much smaller coupling loss.

In the optical fan-in/fan-out device 1 according to the embodiment, in terms of reduction of the coupling loss, the effective cross-sectional area $A_{eff}$ of the first core 21 of each relay fiber end surface in the large-diameter end surface side of the tapered portion 31 needs to be in a range of ±15 $\mu m^2$ of the central value in design with respect to the effective cross-sectional area $A_{eff}$ of the core in the end surface of the single-core optical fiber F1; and the effective cross-sectional area $A_{eff}$ of the second core 22 in each relay fiber end surface in the small-diameter end surface side of the tapered portion 31 needs to be in a range of ±15 $\mu m^2$ of the central value in design with respect to the effective cross-sectional area $A_{eff}$ of the core in the end surface of the multi-core fiber F2. In addition, it is more preferable that a variation in effective cross-sectional area $A_{eff}$ between the first core 21 in each relay fiber end surface in the large-diameter end surface side of the tapered portion 31 and the second core 22 in each relay fiber end surface in the small-diameter end surface side of the tapered portion 31 be ±10 $\mu m^2$.

In order to satisfy these requirements, $r_{2S}/r_{1S}$ needs to be set to be $-3\times\Delta_1/\Delta_2+10$ or more.

If $r_{2S}/r_{1S}$ is less than $-3\times\Delta_1/\Delta_2+10$, the effective cross-sectional area $A_{eff}$ of the second core 22 in each relay fiber end surface in the small-diameter end surface side of the tapered portion 31 becomes too small. However, since the upper and middle conditions in the above-described Equation (1) are limited, the effective cross-sectional area $A_{eff}$ of the first core 21 in each relay fiber end surface in the large-diameter end surface EF1 side of the tapered portion 31 can be prevented from being excessively large.

In this manner, the above-described Equation (1) is satisfied, so that the optical fan-in/fan-out device 1 capable of further reducing the loss can be implemented. Therefore, for example, even in the case where a difference in degree of elongation rate of the relay fiber 2 or the like occurs due to a variation in the manufacturing or the like, the optical fan-in/fan-out device 1 capable of further reducing the loss can be implemented.

In addition, in the embodiment, the relative refractive index difference of the outer circumference clad 3 with respect to the clad 23 is set to be -0.1% or more and 0.1% or less.

In the case where the relative refractive index difference of the outer circumference clad 3 with respect to the clad 23 is less than -0.1%, there is large possibility in that in the high-order mode occurring in the clad 23, light does not propagates through the outer circumference clad 3 but the high-order mode light is coupled with the basic mode light.

On the other hand, in the case where the relative refractive index difference of the outer circumference clad 3 with respect to the clad 23 exceeds 0.1%, the high-order mode light occurring in the relay fiber 2 located on the axis of the outer circumference clad 3 is difficult to escape due to existence of the clad 23 in the relay fiber 2 adjacent to the above-mentioned relay fiber 2. As a result, there is large possibility in that the high-order mode light in the relay fiber 2 located on the axis of the outer circumference clad 3 is coupled with the basic mode light.

Therefore, the relative refractive index difference of the outer circumference clad 3 with respect to the clad 23 is set to be −0.1% or more and 0.1% or less, so that multi-optical path interference caused by the above-described possibility is reduced. Accordingly, the loss can be suppressed by an amount corresponding to the reduction of the multi-optical path interference.

Second Embodiment

Next, a preferred second embodiment of the present invention will be described in detail with reference to the drawings. In addition, the components which are the same as or equivalent to the components of the first embodiment are denoted by the same reference numerals, and the description thereof is not presented except for particularly described cases.

Figure 5A:
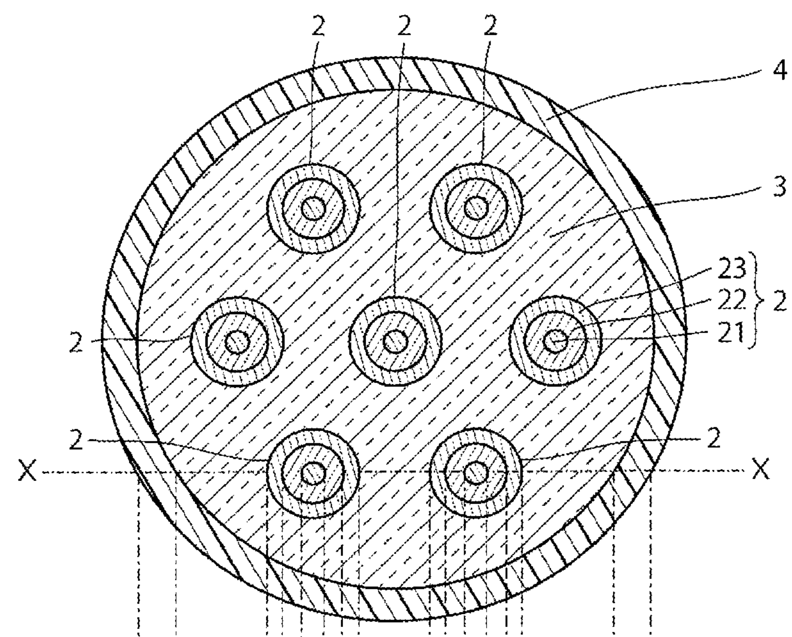
FIGS. 5A and 5B are diagrams illustrating an optical fan-in/fan-out device according to a second embodiment as seen in the same point of view as FIG. 2.
Figure 5B:
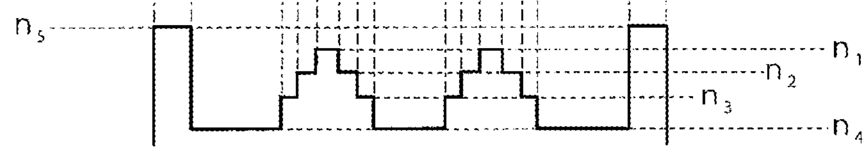

FIGS. 5A and 5B are diagrams illustrating a state of an optical fan-in/fan-out device according to a second embodiment as seen in the same point of view as FIGS. 2A and 2B. As illustrated in FIG. 5A, the optical fan-in/fan-out device according to the second embodiment is different from the optical fan-in/fan-out device I according to the first embodiment in that the optical fan-in/fan-out device according to the embodiment includes a new outermost circumference clad 4 which surrounds the circumference surface of the outer circumference clad 3 without clearance.

As illustrated in FIG. 5B, the refractive index $n_5$ of the outermost circumference clad 4 is set to be higher than the refractive index $n_4$ of the outer circumference clad 3. In the embodiment, the refractive index $n_5$ of the outermost circumference clad 4 is set to be higher than the refractive index $n_1$ of the first core 21 which is highest among the refractive indexes of the first core 21, the second core 22, the clad 23, and the outer circumference clad 3.

Therefore, absorption efficiency of the high-order mode can be increased in the vicinity of the circumference surface of the outer circumference clad 3, so that the multi-optical path interference caused by the high-order mode can be reduced. Accordingly, the loss can be further suppressed.

In addition, in general, a distance between the circumference surface of the outer circumference clad 3 and the circumference surface of the relay fiber 2 adjacent to the above-described relay fiber 2 located on the axis of the outer circumference clad 3 is smaller than a distance between the core and the clad in a single-core optical fiber. Therefore, in the optical fan-in/fan-out device 1 where the plurality of relay fibers 2 is surrounded by the outer circumference clad 3, it is particularly important to increase the absorption efficiency of the high-order mode in the vicinity of the circumference surface of the outer circumference clad 3.

Although the embodiment is described as an example, the present invention is not limited to the embodiment.

Figure 6:
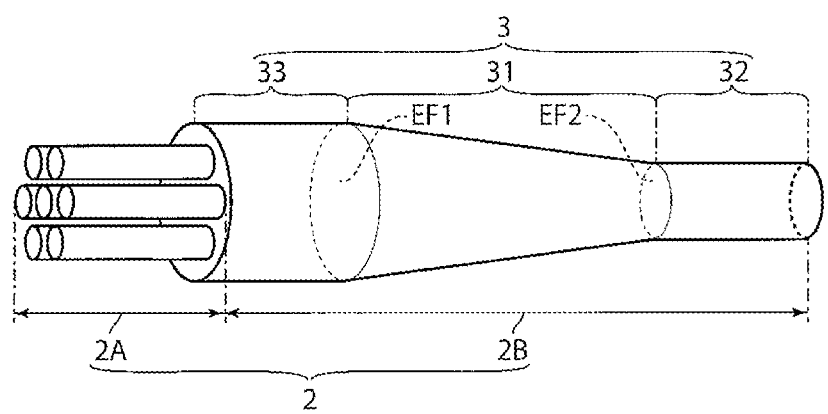
FIG. 6 is a diagram illustrating an optical fan-in/fan-out device according to another embodiment as seen in the same point of view as FIG. 1.
Figure 7A:
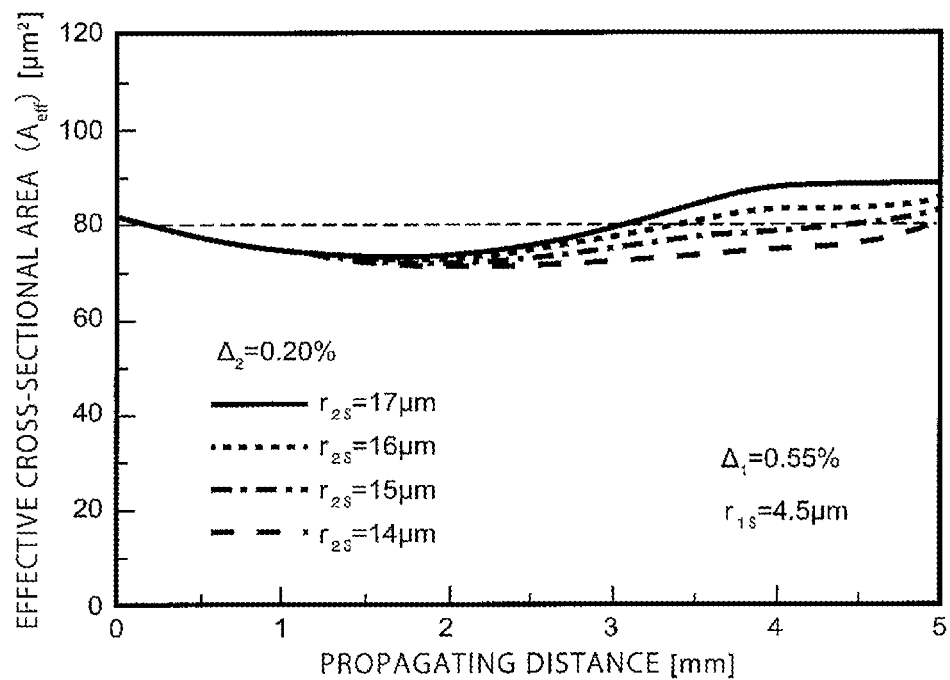
FIGS. 7A to 7D are graphs illustrating a change in effective cross-sectional area of cores in a case where an elongation rate of a relay fiber is set to 1/3.4.
Figure 7B:
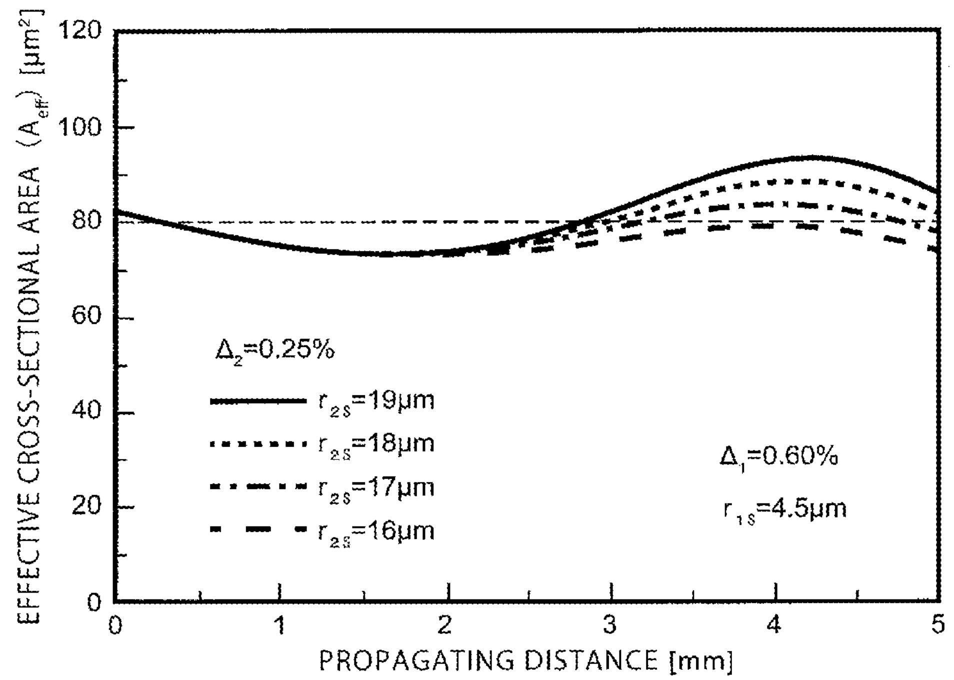
Figure 7C:
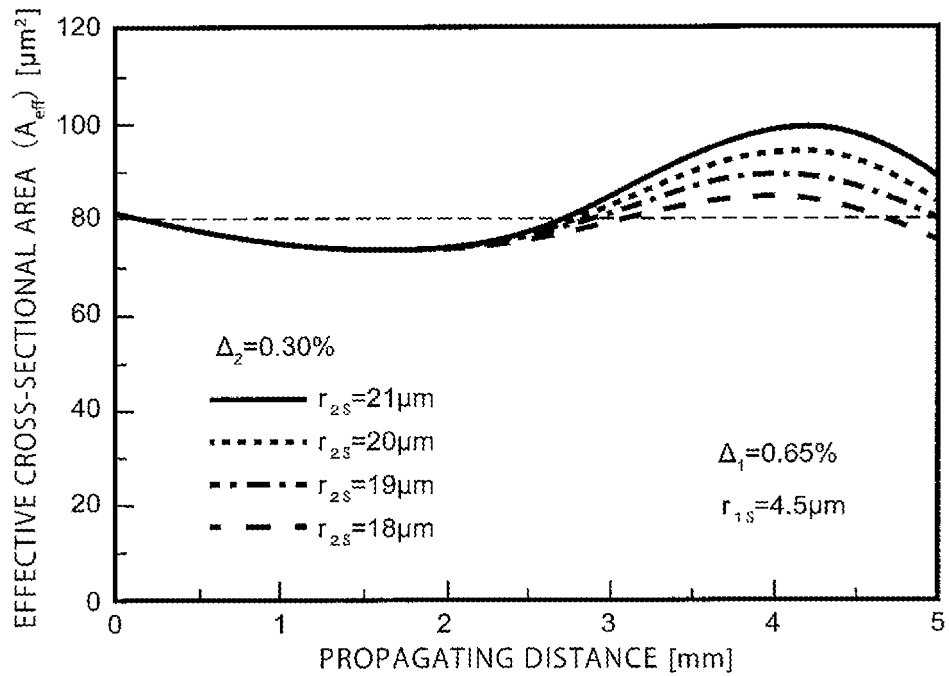
Figure 7D:
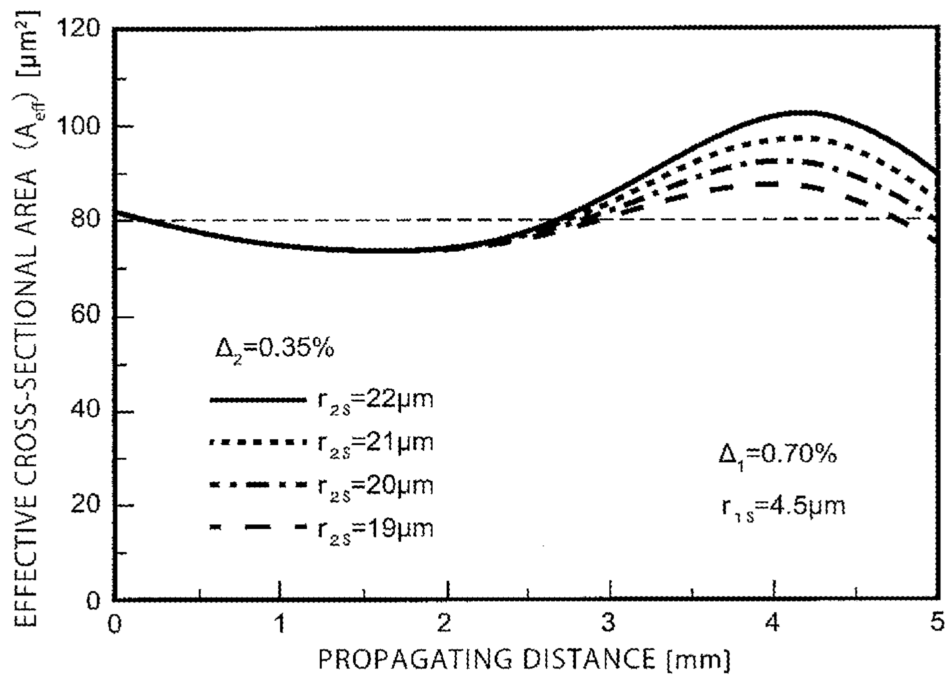
Figure 8A:
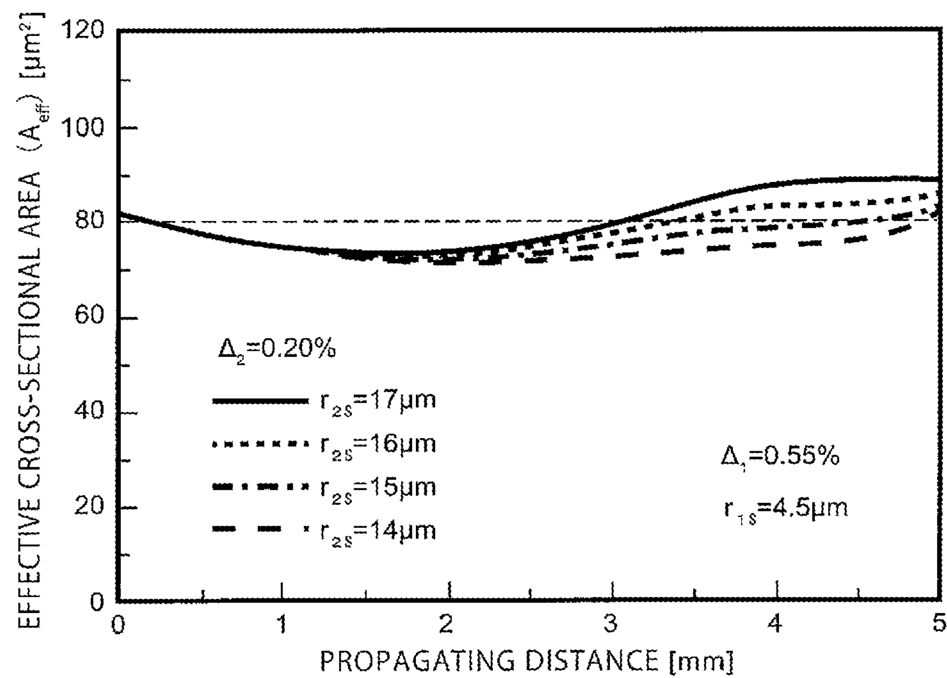
FIGS. 8A to 8D are graphs illustrating a change in effective cross-sectional area of cores in a case where an elongation rate of a relay fiber is set to 1/3.5.
Figure 8B:
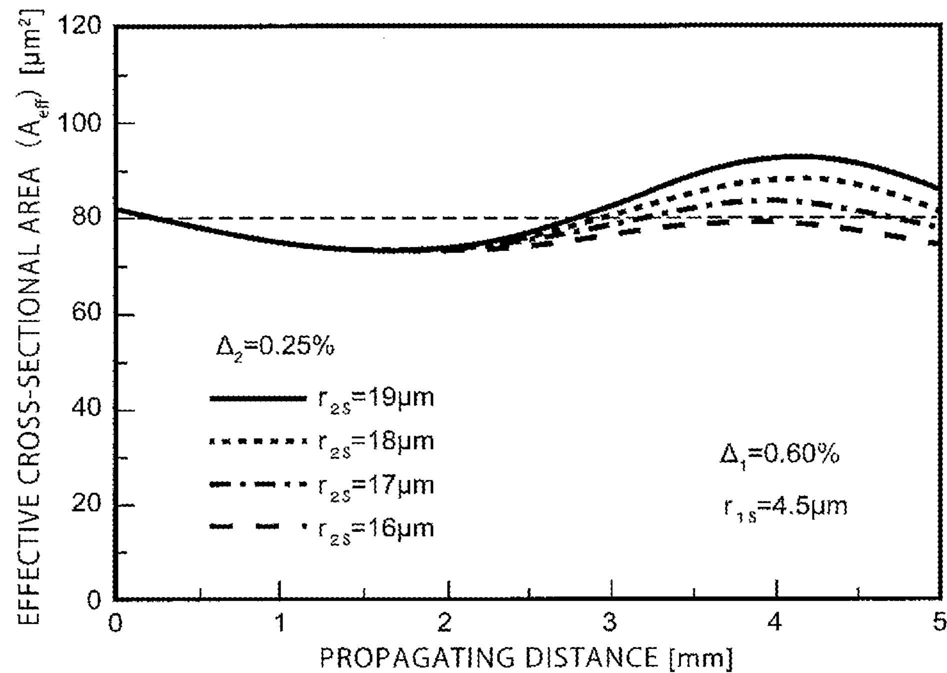
Figure 8C:
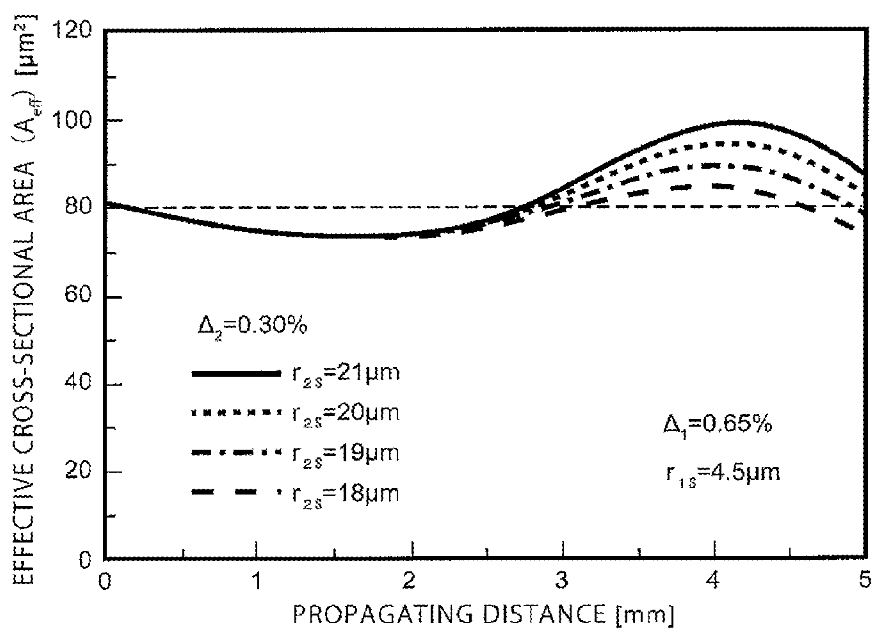
Figure 8D:
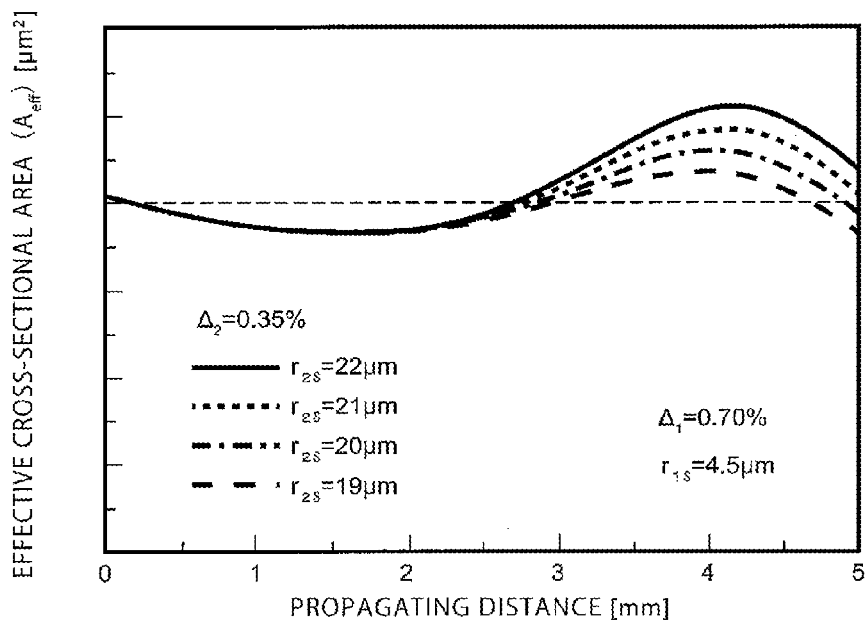
Figure 9A:
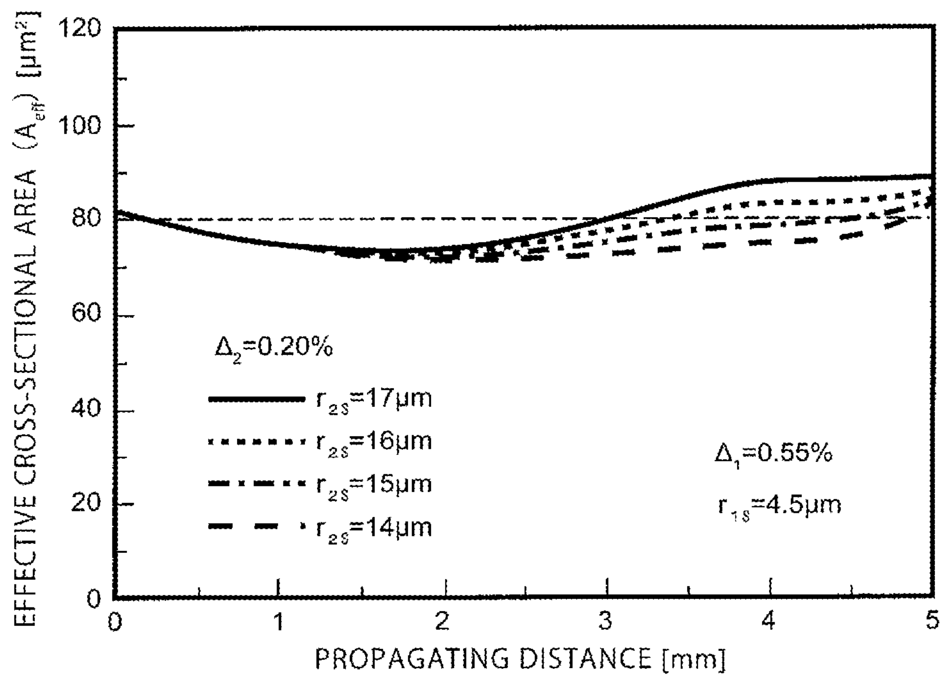
FIGS. 9A to 9D are graphs illustrating a change in effective cross-sectional area of cores in a case where an elongation rate of a relay fiber is set to 1/3.6.
Figure 9B:
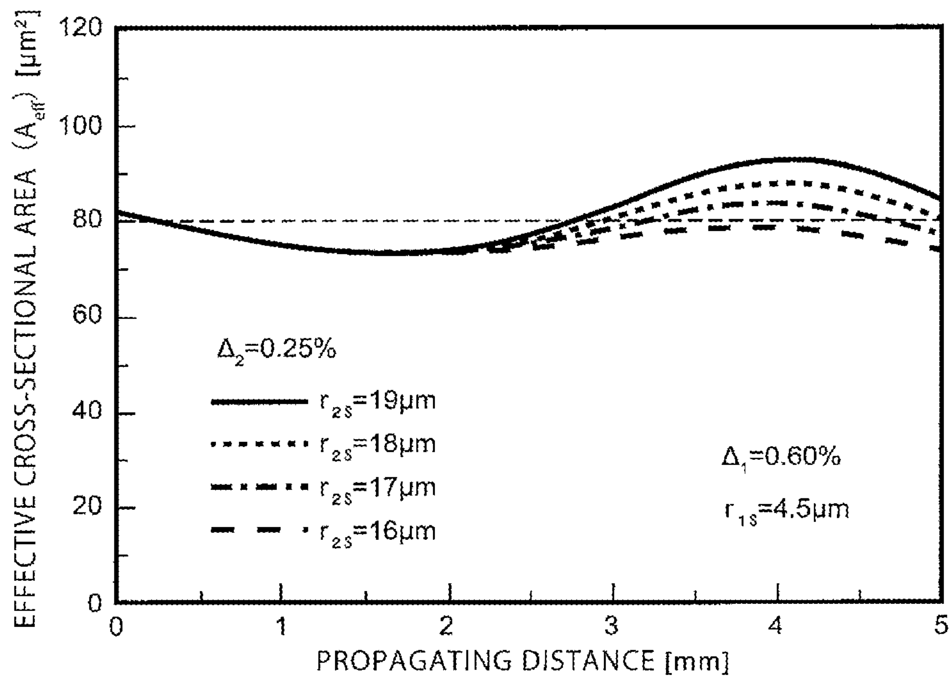
Figure 9C:
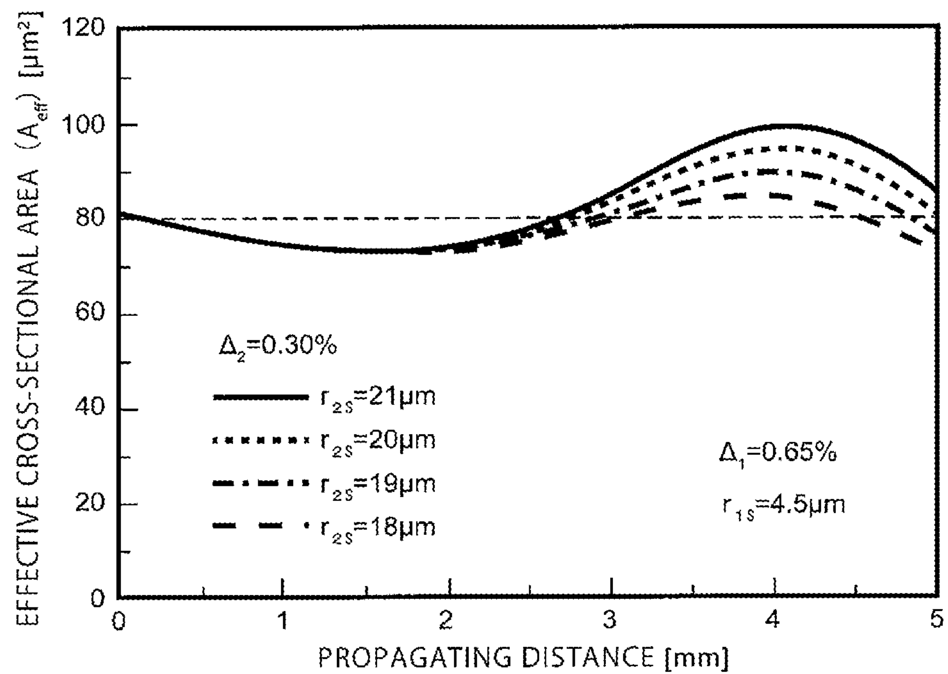
Figure 9D:
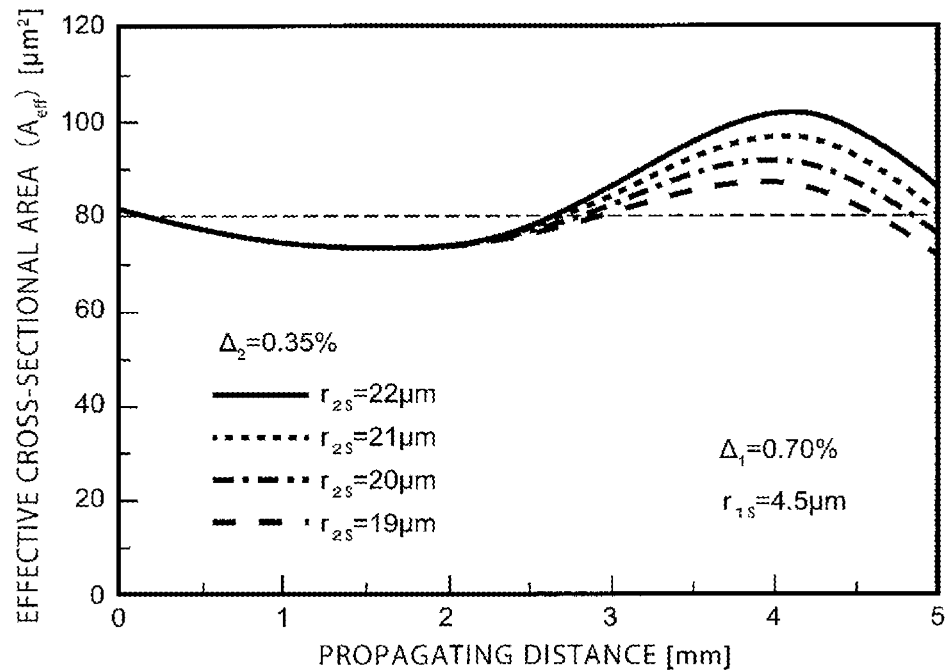
Figure 10A:
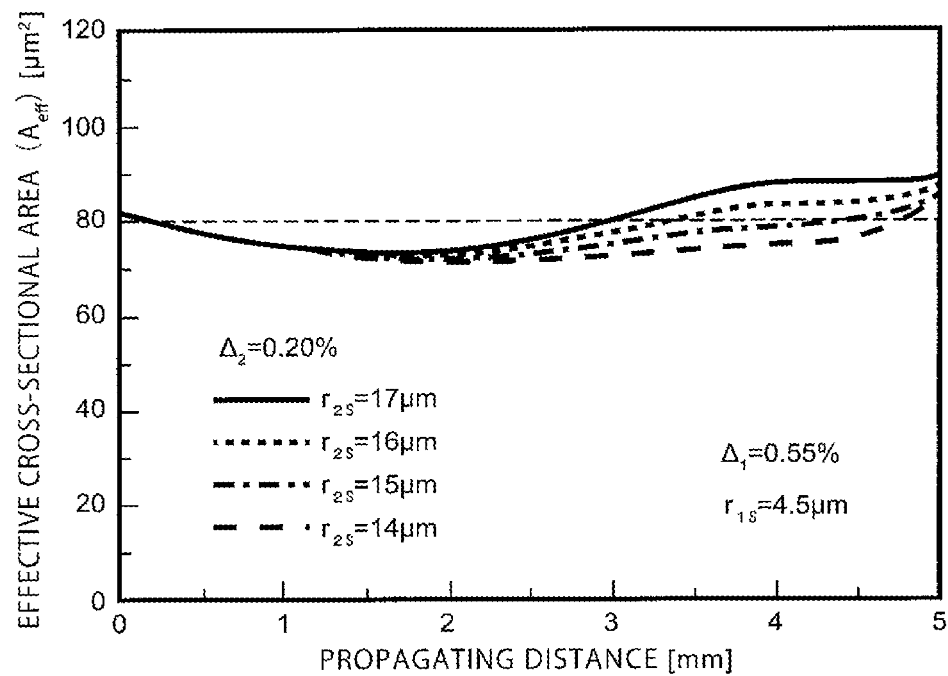
FIGS. 10A to 10D are graphs illustrating a change in effective cross-sectional area of cores in a case where an elongation rate of a relay fiber is set to 1/3.7.
Figure 10B:
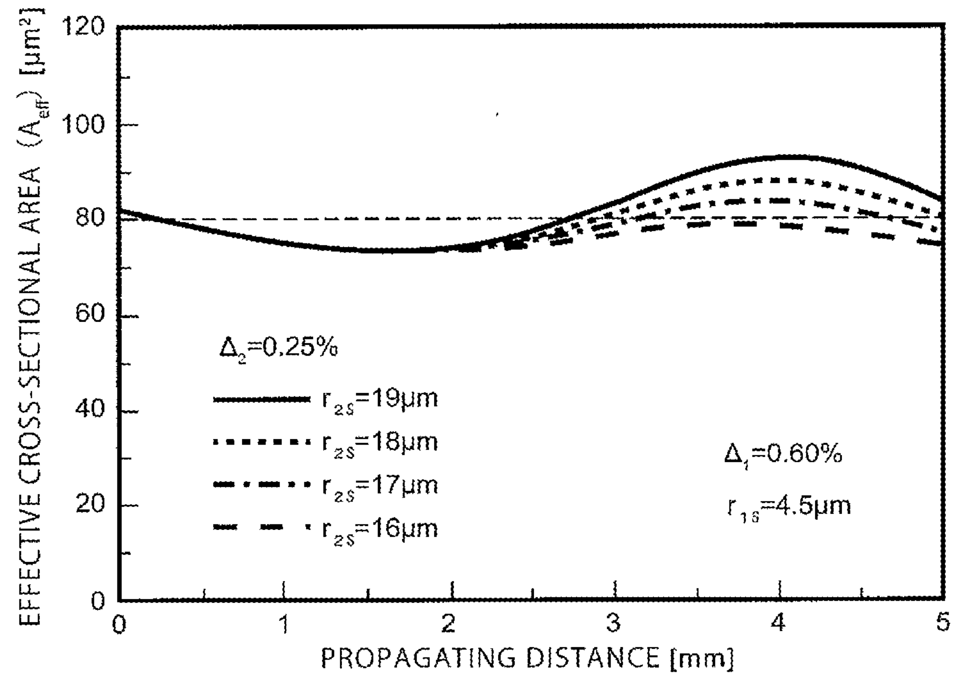
Figure 10C:
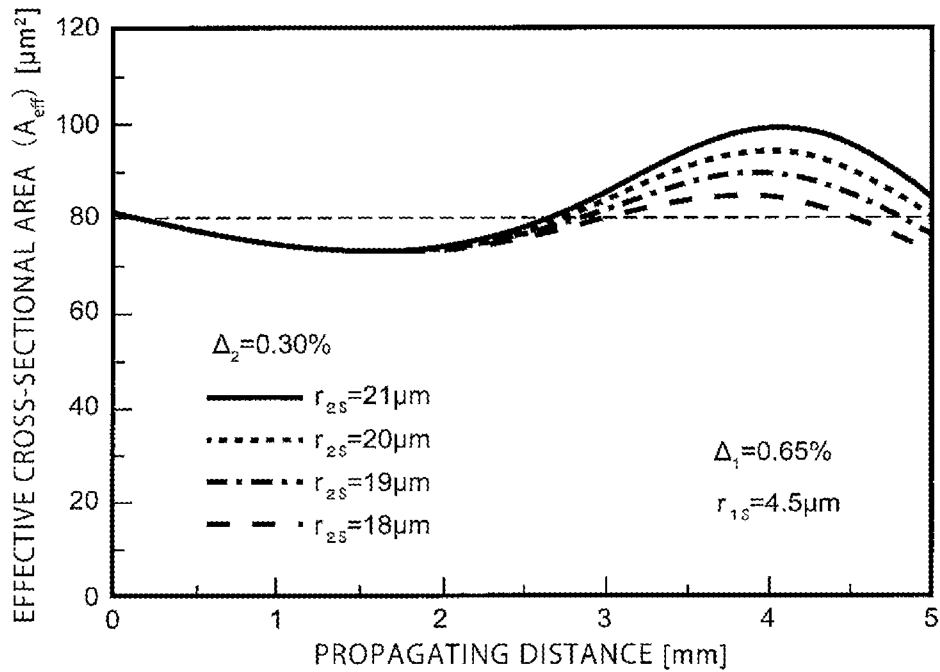
Figure 10D:
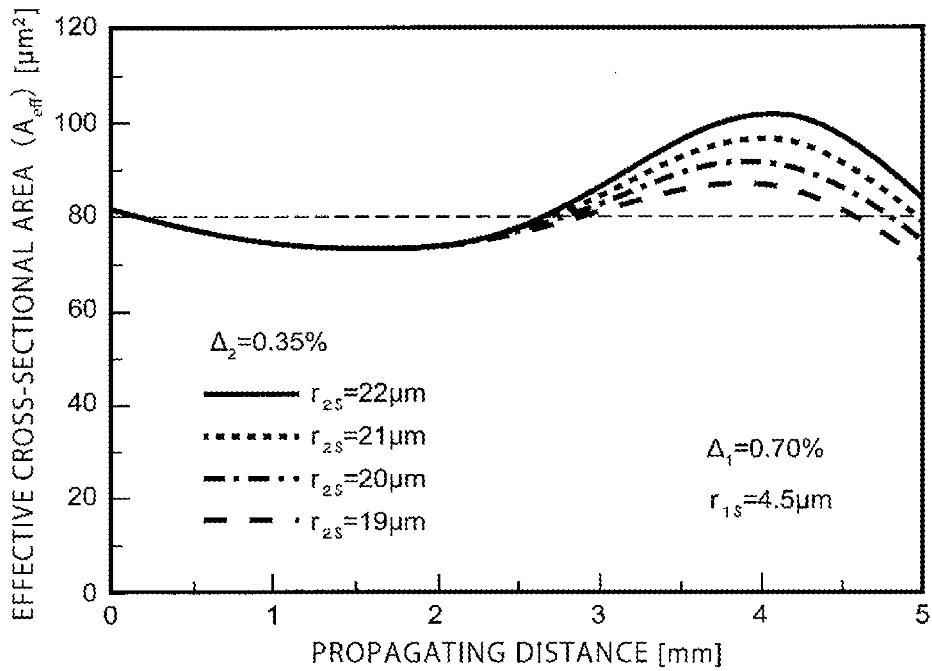

For example, in the above-described embodiment, although the small-diameter portion 32 is formed to be integrated with the small-diameter end surface EF2 of the tapered portion 31, the small-diameter portion 32 may not be presented. In addition, as illustrated in the optical fan-in/fan-out device of FIG. 6, a large-diameter portion 33 which is extended with a diameter substantially equal to the diameter of the end surface EF1 may be formed to be integrated with the large-diameter end surface EF1 of the tapered portion 31. That is, it is preferable that the outer circumference clad 3 have a tapered portion by which the plurality of relay fibers 2 is shrunk in diameter from the one end side toward the other end side.

In addition, in the above-described embodiment, although a portion of each relay fiber 2 is exposed as an exposed portion 2A from the outer circumference clad 3, the exposed portion 2A may not be presented. In addition, in order to easily fuse and connect of the single-core optical fiber F1 to each end surface of the relay fibers 2 in the large-diameter end surface EF1 side of the outer circumference clad 3, it is preferable that a portion of each relay fiber 2 be exposed as an exposed portion 2A from the outer circumference clad 3.

In addition, in the above-described embodiment, although the number of relay fibers 2 is set to be seven, the number may be set to be any one of two to six and to be eight or more. That is, various numbers of two or more can be used. In addition, in order to allow the optical properties caused from the arrangement of the relay fibers 2 to be maintained uniform, it is preferable that the number of the relay fibers 2 be a number capable of arranging the relay fibers to be symmetric with respect to the axis of the outer circumference clad 3.

EXAMPLE

Hereinafter, the present invention will be described in detail by using examples and comparative examples. However, the present invention is not limited to the below-descried examples.

EXAMPLE

In the optical fan-in/fan-out device 1, in the case where a length of the tapered portion 31 was fixed to 5 mm, the radius $r_{1S}$ and relative refractive index difference $\Delta_1$ of the first core 21 and the relative refractive index difference $\Delta_2$ of the second core were fixed to predetermined values, and the radius $r_{2S}$ of the second core and the elongation rate of the relay fiber 2 were changed, numerical experiments with respect to the effective cross-sectional area of the core (effective core cross-sectional area) of the relay fiber portion 2B were performed. In addition, in the numerical experiments, a wavelength of light incident on the relay fiber portion 23 was set to 1550 nm.

Figure 11A:
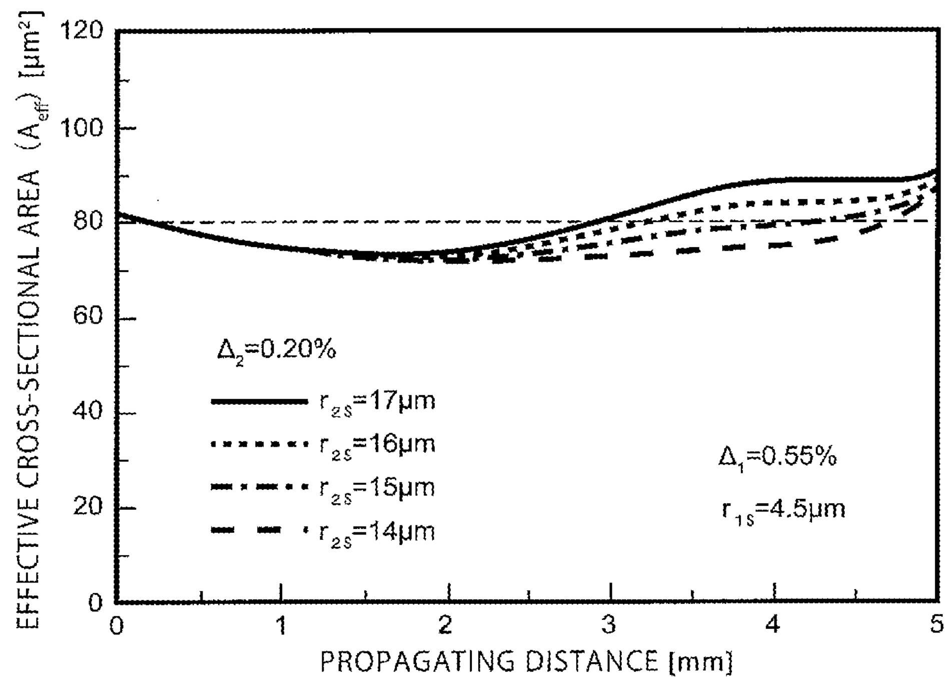
FIGS. 11A to 11D are graphs illustrating a change in effective cross-sectional area of cores in a case where an elongation rate of a relay fiber is set to 1/3.8.
Figure 11B:
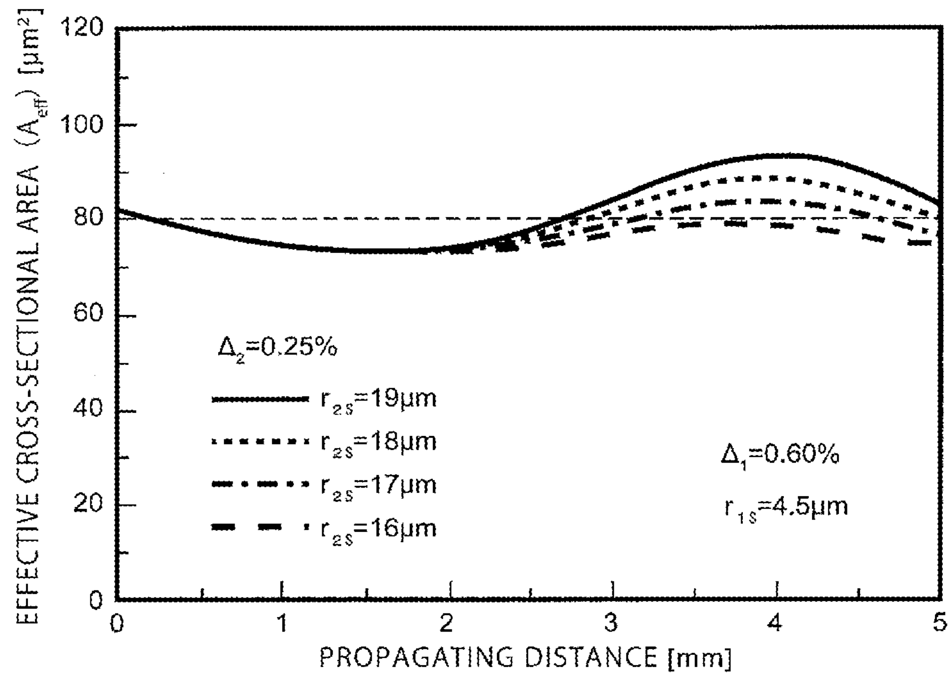
Figure 11C:
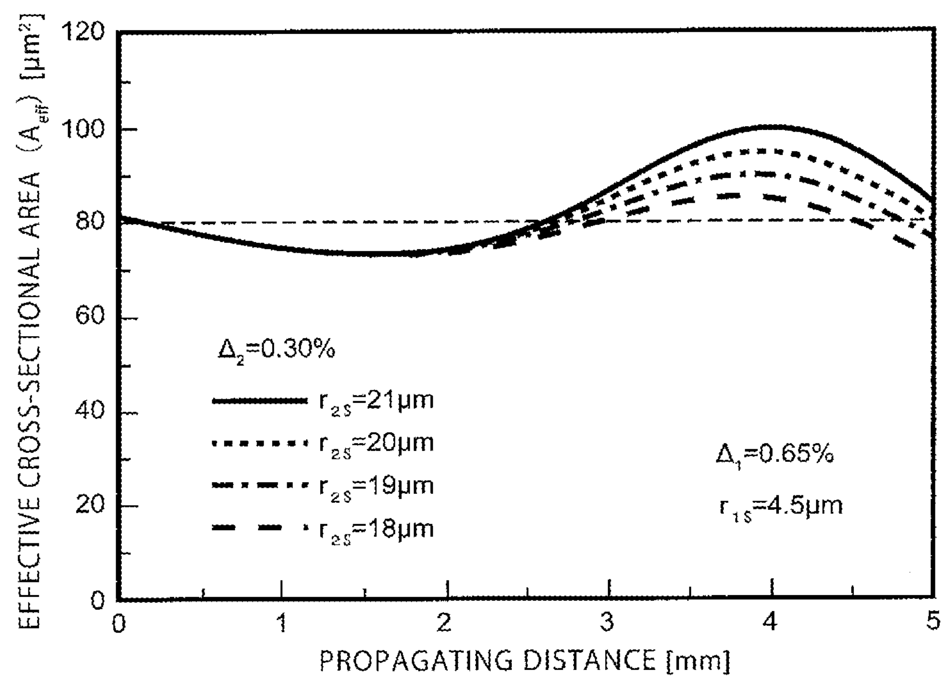
Figure 11D:
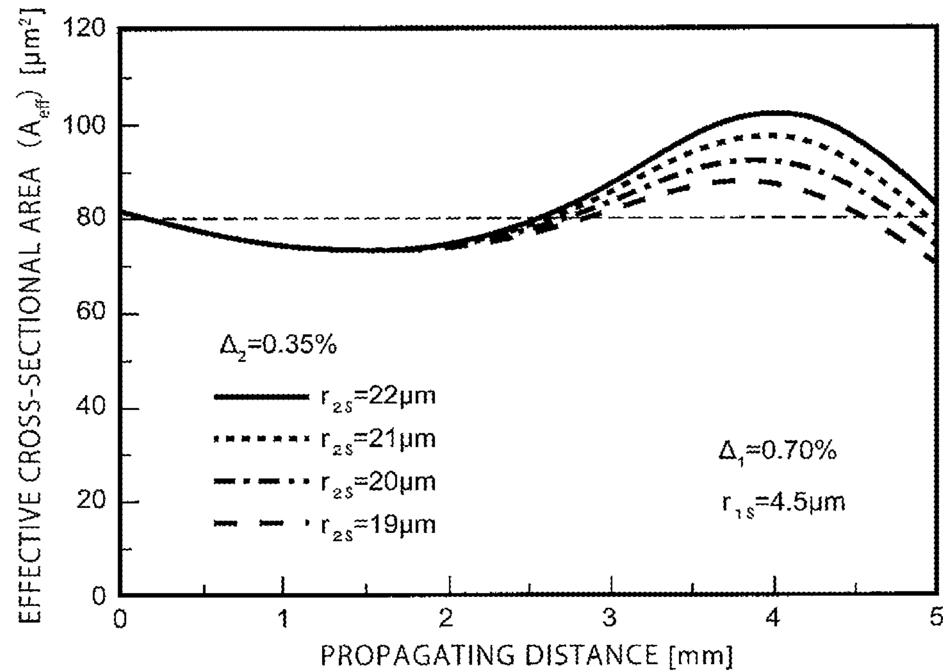
Figure 12A:
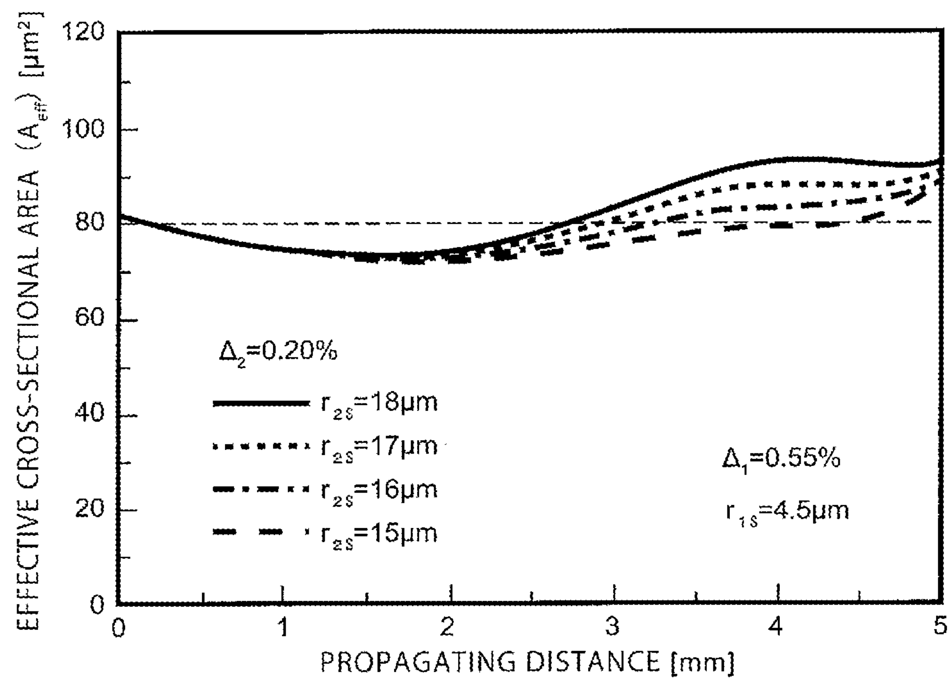
FIGS. 12A to 12D are graphs illustrating a change in effective cross-sectional area of cores in a case where an elongation rate of a relay fiber is set to 1/3.9.
Figure 12B:
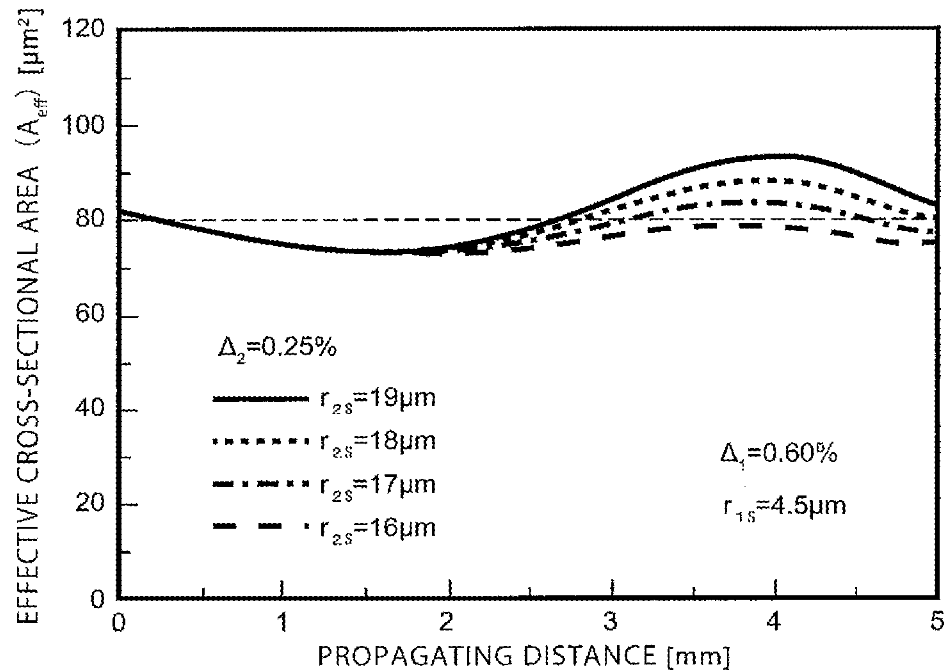
Figure 12C:
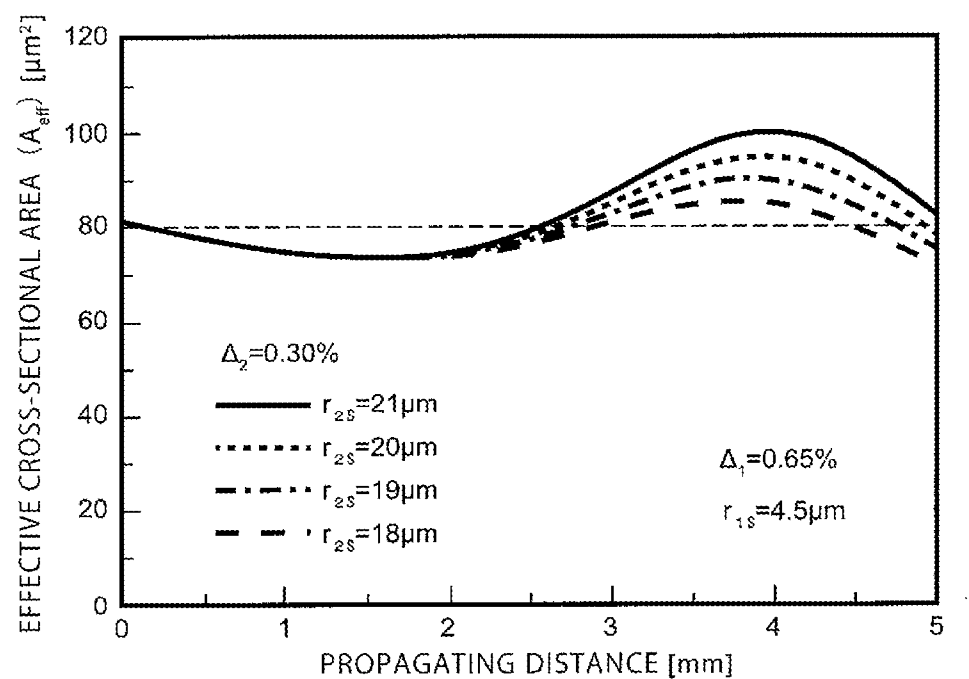
Figure 12D:
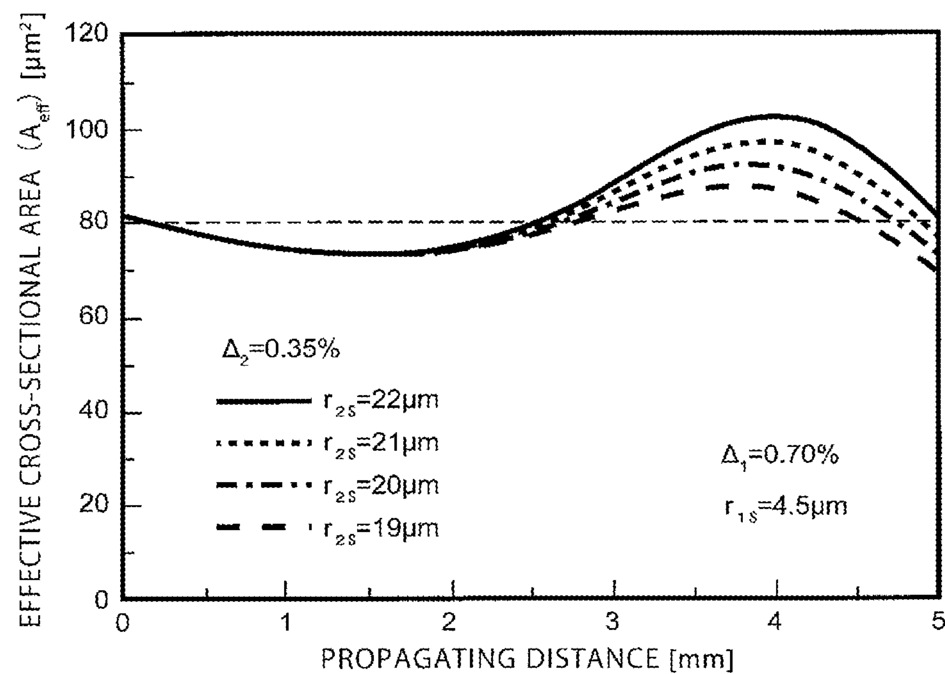

FIGS. 7A to 7D are graphs illustrating a change in effective cross-sectional area of cores in the case where the elongation rate of the relay fiber 2 is set to 1/3.4. FIGS. 8A to 8D are graphs illustrating a change in effective cross-sectional area of cores in the case where the elongation rate of the relay fiber 2 is set to 1/3.5. FIGS. 9A to 9D are graphs illustrating a change in effective cross-sectional area of cores in the case where the elongation rate of the relay fiber 2 is set to 1/3.6. FIGS. 10A to 10D are graphs illustrating a change in effective cross-sectional area of cores in the case where the elongation rate of the relay fiber 2 is set to 1/3.7. FIGS. 11A to 11B are graphs illustrating a change in effective cross-sectional area of cores in the case where the elongation rate of the relay fiber 2 is set to 1/3.8. FIGS. 12A to 12D are graphs illustrating a change in effective cross-sectional area of cores in the case where the elongation rate of the relay fiber 2 is set to 1/3.9.

In addition, in each of FIGS. 7A, 8A, 9A, 10A, 11A and 12A, the radius $r_{1S}$ of the first core 21 is set to 4.5 μm, the relative refractive index difference $\Delta_1$ is set to 0.55%, the relative refractive index difference $\Delta_2$ of the second core is set to 0.20%, and the radius $_{res}$ of the second core is changed in a range of 14 μm to 17 μm. In each of FIGS. 7B, 8B, 9B, 10B, 11B and 12B, the radius $r_{1S}$ of the first core 21 is set to 4.5 μm, the relative refractive index difference $\Delta_1$ is set to 0.60%, the relative refractive index difference $\Delta_2$ of the second core is set to 0.25%, and the radius $r_{2S}$ of the second core is changed in a range of 16 μm to 19 μm. In each of FIGS. 7C, 8C, 9C, 10C, 11C and 12C, the radius $r_{1S}$ of the first core 21 is set to 4.5 μm, the relative refractive index difference $\Delta_1$ is set to 0.65%, the relative refractive index difference $\Delta_2$ of the second core is set to 0.30%, and the radius $r_{25}$ of the second core is changed in a range of 18 μm to 21 μm. In each of FIGS. 7D, 8D, 9D, 10D, 11D and 12D, the radius $r_{1S}$ of the first core 21 is set to 4.5 μm, the relative refractive index difference $\Delta_1$ is set to 0.70%, the relative refractive index difference $\Delta_2$ of the second core is set to 0.35%, and the radius $r_{2S}$ of the second core is changed in a range of 19 μm to 22 μm.

As illustrated in FIGS. 7A to 12D, even in any cases, the effective cross-sectional area of the core in the longitudinal direction of the relay fiber portion 2B is in a range of 70 $\mu m^2$ to 100 $\mu m^2$. This denotes that a change in mode field diameter in the longitudinal direction of the relay fiber portion 2B is small.

Figure 13:
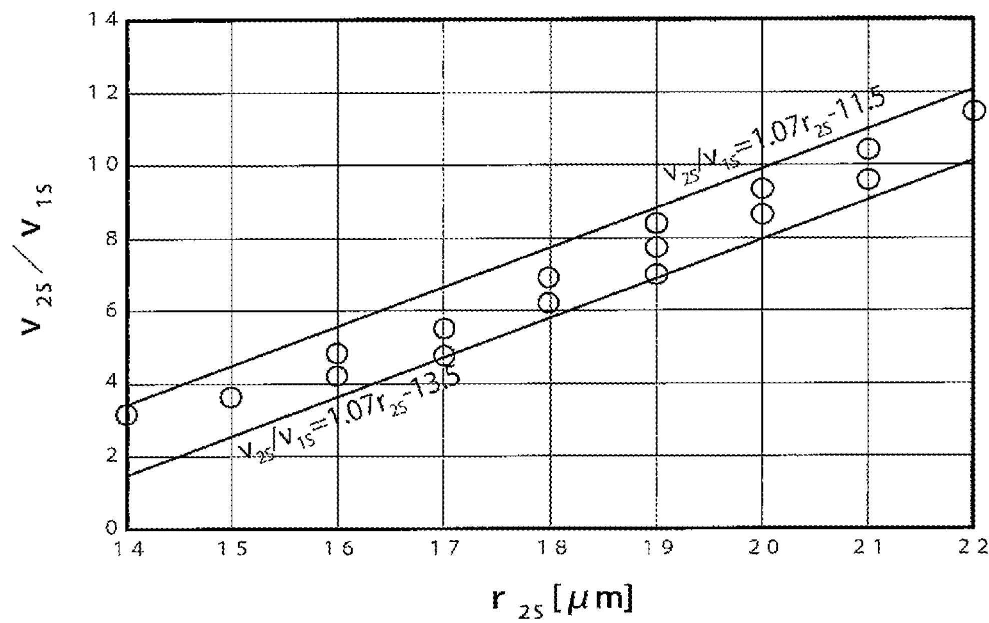
FIG. 13 is a graph illustrating relations between a radius $r_2$ of a second core and $V_2/V_1$ when numerical experiments are performed to obtain the graphs illustrated in FIGS. 7A to 12D.

In addition, FIG. 13 illustrates the relations between the radius $r_{2S}$ of the second core and $V_{2S}/V_{1S}$ when the numerical experiments were performed to obtain the graphs illustrated in FIGS. 7A to 12D.

As illustrated in FIG. 13, in the case where the effective cross-sectional area of the core in the longitudinal direction of the relay fiber portion 2B is in a range of 70 $\mu m^2$ to 100 $\mu m^2$, it can be seen that $V_{2S}/V_{1S}$ is in a range of $1.07r_{2s}-13.5$ or more and $1.07r_{2S}-11.5$ or less.

COMPARATIVE EXAMPLE

As a comparative example, numerical experiments were performed with respect to properties in the case where the radius $r_{1S}$ of the first core 21 is set to 4.5 μm, the radius $r_{2S}$ of the second core 22 is set to 22 μm, the relative refractive index difference $\Delta_1$ of the first core 21 is set to 0.55%, the relative refractive index difference $\Delta_2$ of the second core 22 is set to 0.20%, and the elongation rate of the relay fiber 2 is set to 1/3.6. In addition, in the numerical experiments, the wavelength of light incident on the relay fiber portion 2B was set to 1550 nm.

Figure 14:
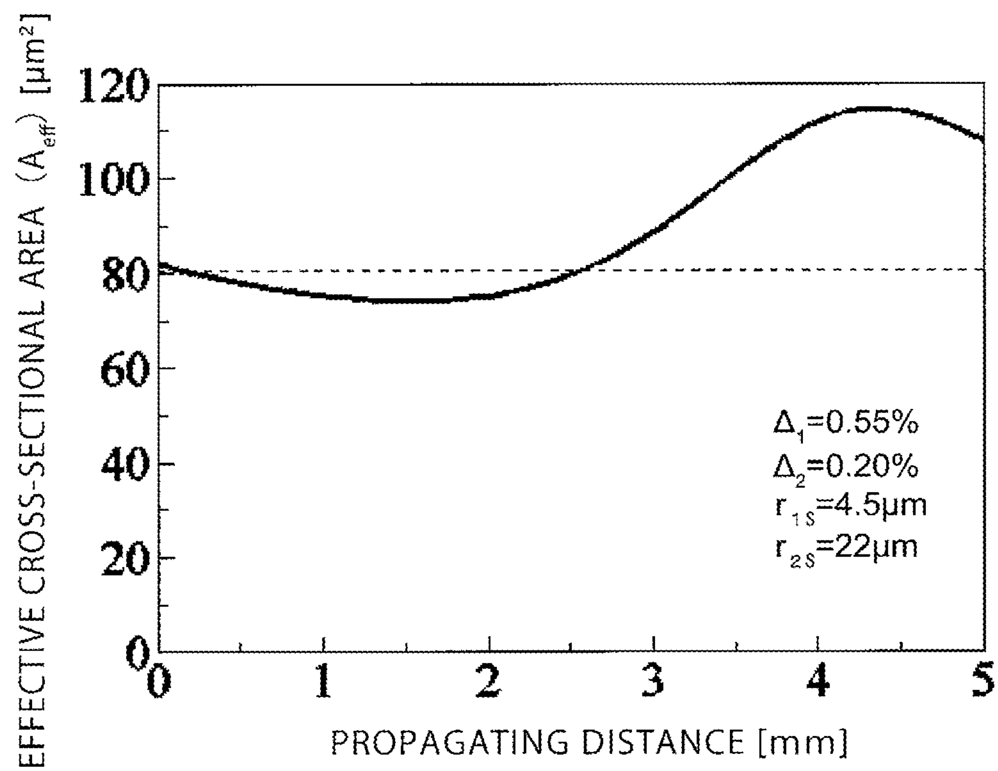
FIG. 14 is a graph illustrating a change in effective cross-sectional area of cores in a comparative example.

In this case, $r_{2S}/r_{1S}$ in the above-described Equation (1) was 4.7, $\Delta_1/\Delta_2$ was 2.75, $V_{2S}/V_{1S}$ was 7.56, and $1.07r_{2S}-13.5$ was 8.97. Therefore, the middle condition in the above-described Equation (1) was not satisfied. FIG. 14 illustrates a change in effective cross-sectional area of cores in this case.

As illustrated in FIG. 14, unlike FIGS. 7A to 12D of the above-described Example, the effective cross-sectional area of the core in the longitudinal direction of the relay fiber portion 2B was not in a range of 70 $\mu m^2$ to 100 $\mu m^2$. In addition, since the effective cross-sectional area $A_{eff}$ of the core in the small-diameter end surface of the tapered portion 31 exceeded 100 $\mu m^2$, the comparative example is not preferred in terms of the coupling with the fiber of which effective cross-sectional area $A_{eff}$ of the core is 80 $\mu m^2$.

In addition, as another comparative example, numerical experiments were performed with respect to properties in the case where the radius $r_{1S}$ of the first core 21 is set to 4.5 μm, the radius $r_{2S}$ of the second core is set to 16 μm, the relative refractive index difference $\Delta_1$ of the first core 21 is set to 0.70%, the relative refractive index difference $\Delta_2$ of the second core 22 is set to 0.35%, the elongation rate of the relay fiber 2 is set to 1/3.6. In addition, in the numerical experiments, the wavelength of light incident on the relay fiber portion 2B was set to 1550 nm.

Figure 15:
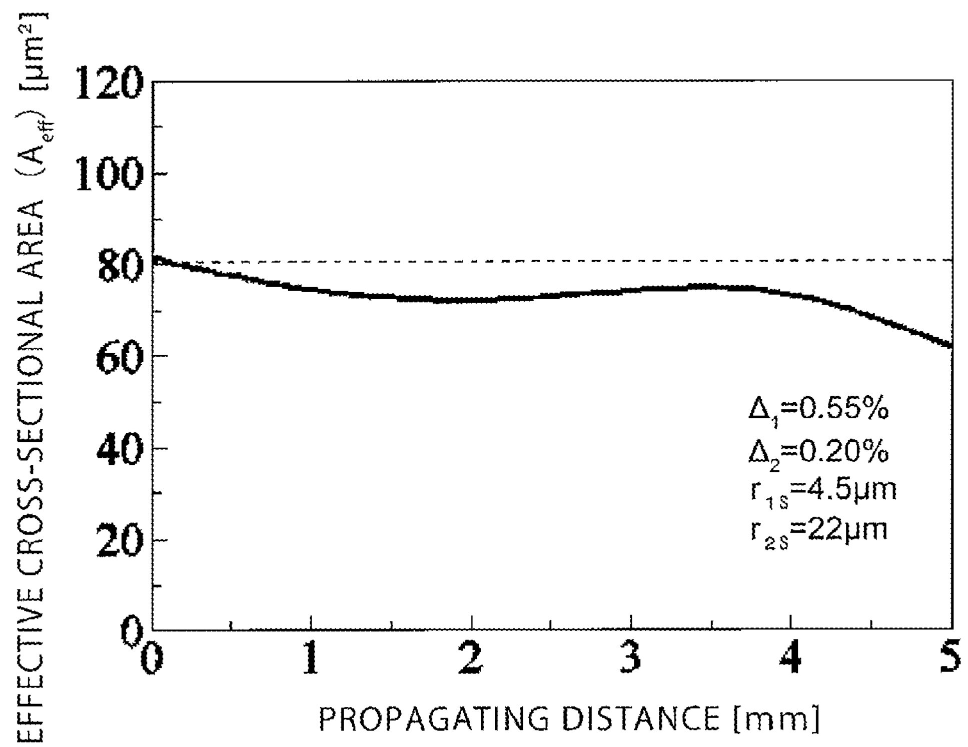
FIG. 15 is a graph illustrating a change in effective cross-sectional area of cores in another comparative example.

In this case, $r_{2S}/r_{1S}$ was 3.56, $\Delta_1/\Delta_2$ was 2.0, and $V_{2S}/V_{1S}$ was 5.82. Therefore, the lower condition in the above-described Equation (1) was not satisfied. FIG. 15 illustrates a change in effective cross-sectional area of cores in this case.

As illustrated in FIG. 15, unlike FIGS. 7A to 12D of the above-described Example, the effective cross-sectional area of the core in the longitudinal direction of the relay fiber portion 2B was not in a range of 70 $\mu m^2$ to 100 $\mu m^2$. In addition, since the effective cross-sectional area $A_{eff}$ of the core in the small-diameter end surface of the tapered portion 31 is less than 65 $\mu m^2$, the comparative example is not preferred in terms of the coupling with the fiber of which effective cross-sectional area $A_{eff}$ of the core is 80 $\mu m^2$.

A prototype optical fan-in/fan-out device having a structure listed in the following Table 1 was manufactured based on the numerical experiments of the above-described Examples.

TABLE 1

| | |
|---|---|
| Radius r1S of First Core in Large-Diameter End Surface | 4.5 μm |
| Radius r2S of Second Core in Large-Diameter End Surface | 14 μm |
| Radius r3S of Clad in Large-Diameter End Surface | 51 μm |
| Diameter Ds of Outer Circumference Clad in Large-Diameter End Surface | 544 μm |
| Distance As of First Core from Center in Large-Diameter End Surface | 136 μm |
| Radius r1i of First Core in Small-Diameter End Surface | 1.3 μm |
| Radius r2i of Second Core in Small-Diameter End Surface | 4.1 μm |
| Radius r3i of Clad in Small-Diameter End Surface | 15 μm |
| Diameter Di of Outer Circumference Clad in Small-Diameter End Surface | 160 μm |
| Distance Ai of First Core from Center in Small-Diameter End Surface | 40 μm |
| Relative Refractive Index Difference Δ 1 of First Core | 0.55% |
| Relative Refractive Index Difference Δ 2 of Second Core | 0.20% |
| Length L of Tapered Portion | 5 mm |
| Elongation Rate Re of Tapered Portion | 1/3.4 |

In the optical fan-in/fan-out device having the structure listed in Table 1, the refractive index volume $V_{1S}$ of the first core 21 is 35.0% $m^2$, and the refractive index volume $V_{2S}$ of the second core 22 is 110.4% $lm^2$. Therefore, $V_{2S}/V_{1S}$ becomes 3.15, $1.07r_{2S}-13.5$ becomes 1.48, and $1.07r_{2S}-11.5$ becomes 3.48. As a result, $V_{2S}/V_{1S}$ satisfies the upper and middle conditions of the above-described Equation (1). In addition, $r_{2S}/r_{1S}$ becomes 3.11, $\Delta_1/\Delta_2$ becomes 2.75, and $-3\times\Delta_1/\Delta_2+10$ becomes 1.75, so that $r_{2S}/r_{1S}$ also satisfies the lower condition of the above-described Equation (1).

In this manner, in the prototype optical fan-in/fan-out device, mean crosstalk becomes −50 dB or less, and mean insertion loss becomes 0.5 dB. Therefore, it was verified that excessive loss leading to light leakage to the clad is very small. In addition, the insertion loss includes coupling loss with respect to a general single core fiber in a large-diameter end surface, coupling loss with respect to a multi-core fiber in a small-diameter end surface, and loss occurring in the course of a change in structure of the device.

In addition, a prototype optical fan-in/fan-out device having a structure listed in the following Table 2 was manufactured based on the numerical experiments of the above-described Examples.

TABLE 2

| | |
|---|---|
| Radius r1S of First Core in Large-Diameter End Surface | 4.5 μm |
| Radius r2S of Second Core in Large-Diameter End Surface | 14 μm |
| Radius r3S of Clad in Large-Diameter End Surface | 51 μm |
| Diameter Ds of Outer Circumference Clad in Large-Diameter End Surface | 612 μm |
| Distance As of First Core from Center in Large-Diameter End Surface | 136 μm |
| Radius r1i of First Core in Small-Diameter End Surface | 1.3 μm |
| Radius r2i of Second Core in Small-Diameter End Surface | 4.1 μm |
| Radius r3i of Clad in Small-Diameter End Surface | 15 μm |
| Diameter Di of Outer Circumference Clad in Small-Diameter End Surface | 180 μm |
| Distance Ai of First Core from Center in Small-Diameter End Surface | 40 μm |
| Relative Refractive Index Difference Δ 1 of First Core | 0.55% |
| Relative Refractive Index Difference Δ 2 of Second Core | 0.20% |
| Length L of Tapered Portion | 5 mm |
| Elongation Rate Re of Tapered Portion | 1/3.4 |
| Thickness T of Outermost Circumference Clad | 34 μm |

The optical fan-in/fan-out device having the structure listed in Table 2 corresponds to the above-described second embodiment. In the prototype optical fan-in/fan-out device, the refractive index volume $V_{1S}$ of the first core 21 becomes 35.0% $m^2$, the refractive index volume $V_{2S}$ of the second core 22 becomes 110.4% $m^2$, $V_{2S}/V_{1S}$ becomes 3.15, $1.07r_{2S}-13.5$ becomes 1.48, and $1.07r_{2S}-11.5$ becomes 3.48. As a result, $V_{2S}/V_{1S}$ satisfies the upper and middle conditions of the above-described Equation (1). In addition, $r_{2S}/r_{1S}$ becomes 3.11, $\Delta_1/\Delta_2$ becomes 2.75, and $-3 \times \Delta_1/\Delta_2+10$ becomes 1.75, so that $r_{2S}/r_{1S}$, also satisfies the lower condition of the above-described Equation (1).

In this manner, in the prototype optical fan-in/fan-out device, mean crosstalk between the relay fiber portions 2B becomes −55 dB or less, and mean insertion loss becomes 0.5 dB. Therefore, it was verified that excessive loss leading to light leakage to the clad is very small.

An optical fan-in/fan-out device according to the present invention can be used in industrial fields of multi-core fibers.

The invention claimed is:

1. An optical fan-in/fan-out device comprising:

a plurality of relay fibers; and an outer circumference clad which is integrated with each of the plurality of relay fibers to fill a space between the relay fibers and to surround a circumference surface of each relay fiber, wherein the relay fiber includes:

a first core;

a second core which has a refractive index lower than a refractive index of the first core and surrounds a circumference surface of the first core without clearance; and a clad which has a refractive index lower than a refractive index of the second core and surrounds a circumference surface of the second core without clearance, the outer circumference clad has a tapered portion by which the plurality of relay fibers is shrunk in diameter from one end side toward the other end side, and in a case where a radius of the first core in a large-diameter end surface of the tapered portion is denoted by $r_{1S}$, a radius of the second core in the large-diameter end surface is denoted by $r_{2S}$, a relative refractive index difference of the first core with respect to the clad is denoted by $\Delta_1$, a relative refractive index difference of the second core with respect to the clad is denoted by $\Delta_2$, a refractive index volume of the first core expressed by $r_{1S}^2\times\Delta_1$ is denoted by $V_{1S}$, and a refractive index volume of the second core expressed by $\pi(r_{2S}^2-r_{1S}^2)\times\Delta_2$ is denoted by $V_{2S}$, the following equation is satisfied;

$$3\le r_{2S}/r_{1S}\le 5$$

$$1.07r_{2S}-13.5\le V_{2S}/V_{1S}\le 1.07r_{2S}-11.5$$

$$r_{2S}/r_{1S}\ge 3\times\Delta_1/\Delta_2+10.$$

2. The optical fan-in/fan-out device according to claim 1, wherein the relative refractive index difference of the outer circumference clad with respect to the clad is set to he −0.1% or more and 0.1% or less.

3. The optical fan-in/fan-out device according to claim 1 or 2, further comprising an outermost circumference clad which surrounds the circumference surface of the outer circumference clad without clearance, wherein a refractive index of the outermost circumference clad is higher than a refractive index of the outer circumference clad.

* * * * *